(12) United States Patent
McKay

(10) Patent No.: US 7,984,538 B2
(45) Date of Patent: Jul. 26, 2011

(54) INSTALLATION TOOL ASSEMBLY

(75) Inventor: Albert A. McKay, Stoney Creek (CA)

(73) Assignee: Lokring Technology LLC, Willoughby, OH (US)

(*) Notice: Subject to any disclaimer, the term of this patent is extended or adjusted under 35 U.S.C. 154(b) by 1078 days.

(21) Appl. No.: 11/227,502

(22) Filed: Sep. 15, 2005

(65) Prior Publication Data
US 2006/0059677 A1    Mar. 23, 2006

Related U.S. Application Data

(60) Provisional application No. 60/610,824, filed on Sep. 17, 2004.

(51) Int. Cl.
*B23P 15/10* (2006.01)
(52) U.S. Cl. .............. 29/237; 29/252; 29/283.5; 29/520
(58) Field of Classification Search .................... 29/237, 29/252, 289, 283.5, 520
See application file for complete search history.

(56) References Cited

U.S. PATENT DOCUMENTS

| | | | | |
|---|---|---|---|---|
| 2,622,652 | A | * | 12/1952 | Conroy et al. ............. 29/237 |
| 3,047,043 | A | * | 7/1962 | Albrecht .................... 29/237 |
| 3,849,858 | A | * | 11/1974 | Whitledge et al. .......... 29/237 |
| 4,189,817 | A | | 2/1980 | Moebius |
| 4,418,458 | A | * | 12/1983 | Hunter ....................... 29/237 |
| 4,774,828 | A | * | 10/1988 | Schrock ..................... 72/402 |
| 5,027,489 | A | * | 7/1991 | Johnston .................... 29/237 |
| 5,305,510 | A | | 4/1994 | Croft et al. |
| 5,483,731 | A | * | 1/1996 | Prendel et al. ............. 29/237 |
| 5,694,670 | A | * | 12/1997 | Hosseinian et al. ......... 29/237 |
| 6,434,808 | B1 | * | 8/2002 | McKay ...................... 29/237 |
| 6,618,919 | B1 | | 9/2003 | McKay |
| 2005/0183258 | A1 | * | 8/2005 | McKay ...................... 29/468 |

OTHER PUBLICATIONS

International Search Report pertaining to International Application No. PCT/CA2005/001391.

* cited by examiner

*Primary Examiner* — Joseph J Hail, III
*Assistant Examiner* — Shantese L McDonald
(74) *Attorney, Agent, or Firm* — Fay Sharpe LLP

(57) ABSTRACT

An installation tool assembly for advancing a fitting's swage ring onto a fitting's connector body while a conduit is received in the connector body to mechanically and sealingly connect the fitting to the conduit includes a body defining at least two spaced apart piston chambers, a fixed jaw connected to the body and adapted to engage one of the connector body or the swage ring, and a movable jaw connected to the body and movable relative to the fixed jaw. The movable jaw is adapted to engage the other of the connector body or the swage ring. Pistons are disposed in the at least two spaced piston chambers. The pistons and the movable jaw are configured such that movement of the pistons in a first direction moves the movable jaw toward the fixed jaw thereby moving the swage ring axially onto the connector body to mechanically and sealingly connect the connector body to the conduit received therein when the fixed and movable jaws are engaged to the connector body and swage ring. A crossover assembly follows the contours of the body and fluidly connects the at least two spaced apart piston chambers. The crossover assembly is fluidly connectable to a hydraulic pressure source for delivering hydraulic fluid to the at least two spaced apart piston chambers to move the pistons in the first direction.

17 Claims, 12 Drawing Sheets

INSTALLATION TOOL ASSEMBLY

This application claims priority of Provisional Patent Application Ser. No. 60/610,824, filed Sep. 17, 2004, entitled "Installation Tool Assembly", expressly incorporated herein by reference.

BACKGROUND

The present application generally relates to installation tooling and, more particularly, to installation tooling having a crossover assembly. In one embodiment, particular application is found as an installation tool assembly for swage ring fittings that includes a pair of dual piston chambers connected by a crossover assembly. This arrangement allows a single hose to be used to connect the installation tool assembly to a hydraulic source, such as a hydraulic pump. While particular reference will be made to an installation tool assembly having a crossover assembly for hydraulically connecting two sets of dual piston chambers to a hydraulic pressure source via a single hose, it is to be appreciated that the invention may relate to other similar environments and applications.

Generally, one type of fitting for fluid conduits, such as tubes or pipes, includes a connector body that fits loosely over the fluid conduit and a swage ring which compresses and/or physically deforms the connector body against the outside surface of the fluid conduit to provide one or more seals and to provide a strong mechanical connection.

Prior art tools for assembling such a fitting to a fluid conduit often include a fixed jaw, a movable jaw and one or more hydraulic cylinders for moving the movable jaw toward the fixed jaw. The jaws can be configured to grip the swage ring and the connector body such that, upon actuation, the jaws forcibly move the swage ring over the connector body thereby causing the connector body to compress or move radially into the fluid conduit to provide a seal and a mechanical connection. When the swaging is complete, hydraulic pressure in the one or more hydraulic cylinders is reduced to allow the tool to be removed from the fitting. Examples of prior art installation tools are taught in U.S. Pat. No. 4,189,817 ("Hydraulic Assembly Tool for Tube Fittings"); U.S. Pat. No. 5,305,510 ("Hydraulic Assembly Tool with Improved Load Bearing Arrangement for Tube Fittings"); U.S. Pat. No. 5,694,670 ("Secure Swaging Tool"); U.S. Pat. No. 6,434,808 ("Compact Installation Tool"); and U.S. Pat. No. 6,618,919 ("Remote Actuation of Installation Tooling Pump"); and U.S. Patent Publication No. 20050183258 ("Hydraulic Hand Tool"), all expressly incorporated herein by reference.

Many prior art installation tools receive hydraulic power via a hydraulic fluid pumped through a hydraulic hose assembly from a remotely positioned hydraulic pressure supply. The hydraulic pressure supply can include a pump and an electric motor for driving the pump. One prior art installation tool assembly includes a pair of dual piston chambers that are fluidly connected to a remote hydraulic pressure supply pump through a hose assembly. The installation tool assembly having two sets of dual piston chambers has been found to be particularly suitable for forcibly moving swage rings over corresponding connector bodies when the swage rings and connector bodies (together referred to as a fitting) are relatively large in size (such as, for example, when the fitting is 3 NPS or larger).

In order to provide pressurized and hydraulic fluid to both of a pair of dual piston chambers, the hose assembly typically includes a first elongated flexible hose fluidly connecting the first set of dual piston chambers to a remotely spaced Y-manifold and a second elongated flexible hose fluidly connecting the second set of dual piston chambers to the Y-manifold. A third elongated flexible hose is typically used to connect the Y-manifold to the pump. Often, conventional male/female quick disconnects are provided on each of the dual piston chambers, the hoses, the Y-manifold and the hydraulic pump for making readily disconnectable fluid connections between the aforementioned components.

Employment of the Y-manifold, also referred to herein as an adapter, with two elongated hoses of about equal length was generally expected to ensure that both sets of dual piston chambers would operate simultaneously upon generation of hydraulic pressure by the pump. However, it has been found that, under certain conditions, the hydraulic connections formed by mating male and female quick disconnects can come loose without the knowledge of the operator of this type of installation tool assembly. This may occur, for example, when the mating quick disconnects are mechanically connected but not so connected as to open a hydraulic flow path. If a hydraulic connection is not properly made with each of the equal length elongated hoses and only one set of the dual piston chambers is fluidly connected to the pump, severe damage could result due to high forces developed by the hydraulic pressure acting on only one set of the pistons in the one set of chambers.

Accordingly, there is a need to minimize the number of connections required in installation tool assemblies employing multiple and spaced apart piston chambers. Further, any improvements that cause the installation tool assembly and/or its base assembly to be less cumbersome, more compact and/or more mobile are also deemed desirable.

SUMMARY

According to one aspect, an improved installation tool assembly is provided for advancing a fitting's swage ring onto a fitting's connector body while a conduit is received in the connector body to mechanically and sealingly connect the fitting to the conduit. More particularly, in accordance with this aspect, the installation tool assembly includes a body defining at least two spaced apart piston chambers. A fixed jaw is connected to the body and is adapted to engage one of the connector body or the swage ring. A movable jaw is connected to the body and movable relative to the fixed jaw. The movable jaw is adapted to engage the other of the connector body or the swage ring. Pistons are disposed in the at least two spaced piston chambers. The pistons and the movable jaw are configured such that movement of the pistons in a first direction moves the movable jaw toward the fixed jaw thereby moving the swage ring axially onto the connector body to mechanically and sealingly connect the connector body to the conduit received therein when the fixed and movable jaws are engaged to the connector body and swage ring. A crossover assembly follows the contours of the body and fluidly connects the at least two spaced apart piston chambers. The crossover assembly is fluidly connectable to a hydraulic pressure source for delivering hydraulic fluid to the at least two spaced apart piston chambers to move the pistons in the first direction.

According to another aspect, a method of mechanically and sealingly connecting a fitting to a conduit using a hydraulic installation tool assembly is provided. The hydraulic installation tool assembly includes a body defining spaced apart piston chambers, a fixed jaw connected to the body, a movable jaw connected to the body and movable relative to the fixed jaw, and pistons disposed in the piston chambers. The pistons are configured such that movement in a first direction causes the movable jaw to move toward the fixed jaw. The fixed and movable jaws are secured to a swage ring of the fitting and a connector body of the fitting with a conduit received through the swage ring and into the connector body. A hydraulic pressure source is actuated for delivering pressurized hydraulic fluid to the piston chambers. A compact crossover assembly is provided on the body to direct the pressurized hydraulic fluid delivered from the hydraulic pressure source to each of the spaced apart piston chambers. The pressurized hydraulic fluid is delivered from the hydraulic pressure source to each of the spaced apart piston chambers through the crossover assembly. The pistons are moved in the piston chambers in the first direction with the hydraulic fluid that is forced in the piston chambers. The movable jaw is moved with the pistons toward the fixed jaw to axially move the swage ring onto the connector body to mechanically and sealingly connect the connector body to the conduit received therein.

According to still another aspect, a hydraulic assembly tool is provided. More particularly, in accordance with this aspect, the hydraulic assembly tool includes a body defining spaced apart piston chambers. A fixed jaw is one of formed integrally with the body or secured to the body. A movable jaw is secured to and movable relative to the body and the fixed jaw. A piston is disposed in each of the spaced apart piston chambers. Movement of the piston in a first direction moves the movable jaw toward the fixed jaw. A crossover assembly has a rigid tubular connector disposed closely adjacent the body for delivering pressurized hydraulic fluid delivered to a hydraulic connection disposed on the body to each of the spaced apart piston chambers to move the piston disposed in each of the spaced apart piston chambers in the first direction thereby moving the movable jaw toward the fixed jaw.

DETAILED DESCRIPTION

Figure 1:
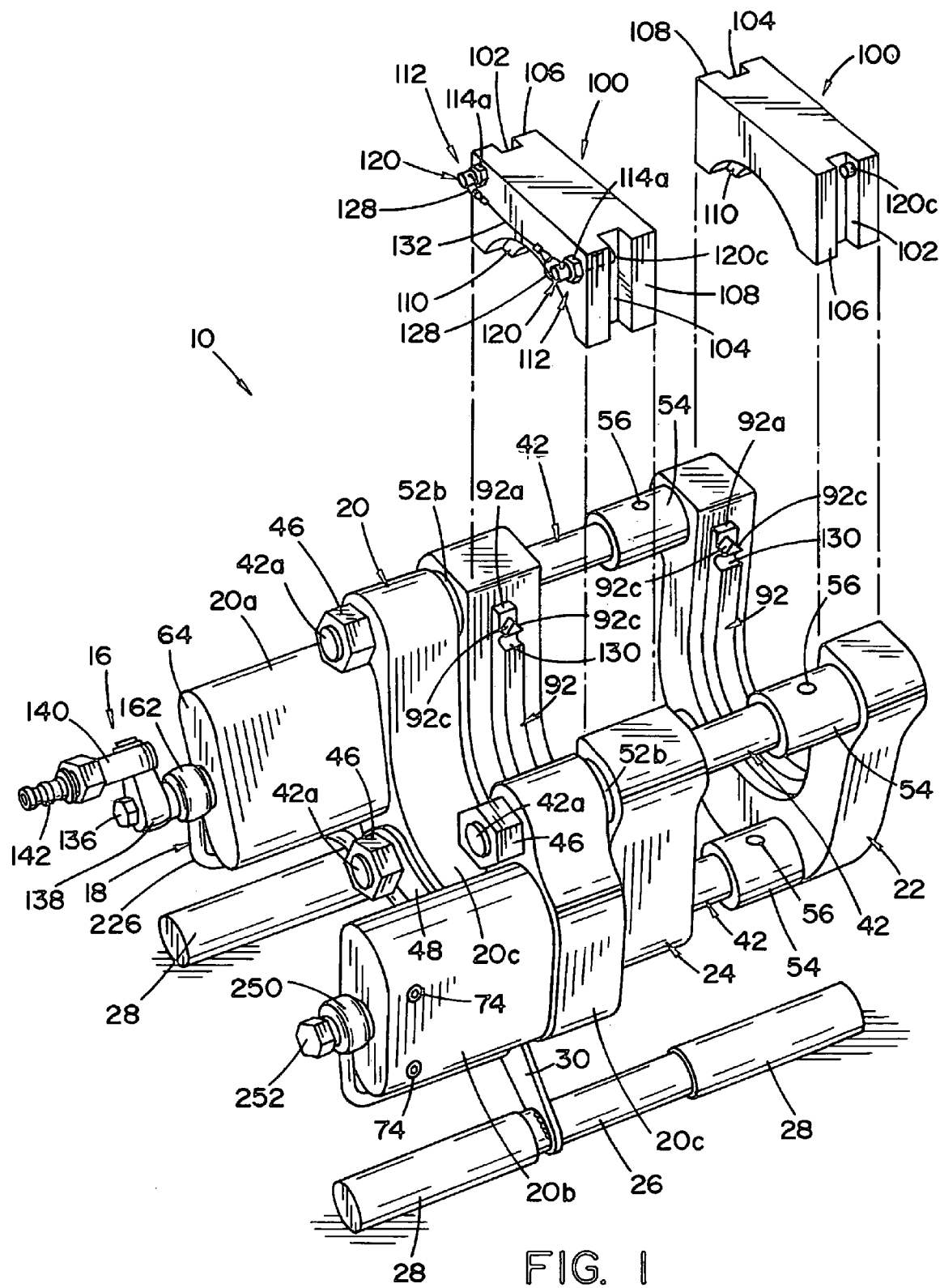
FIG. 1 is an upper perspective view, partially exploded, of an installation tool assembly having a crossover assembly.
Figure 2:
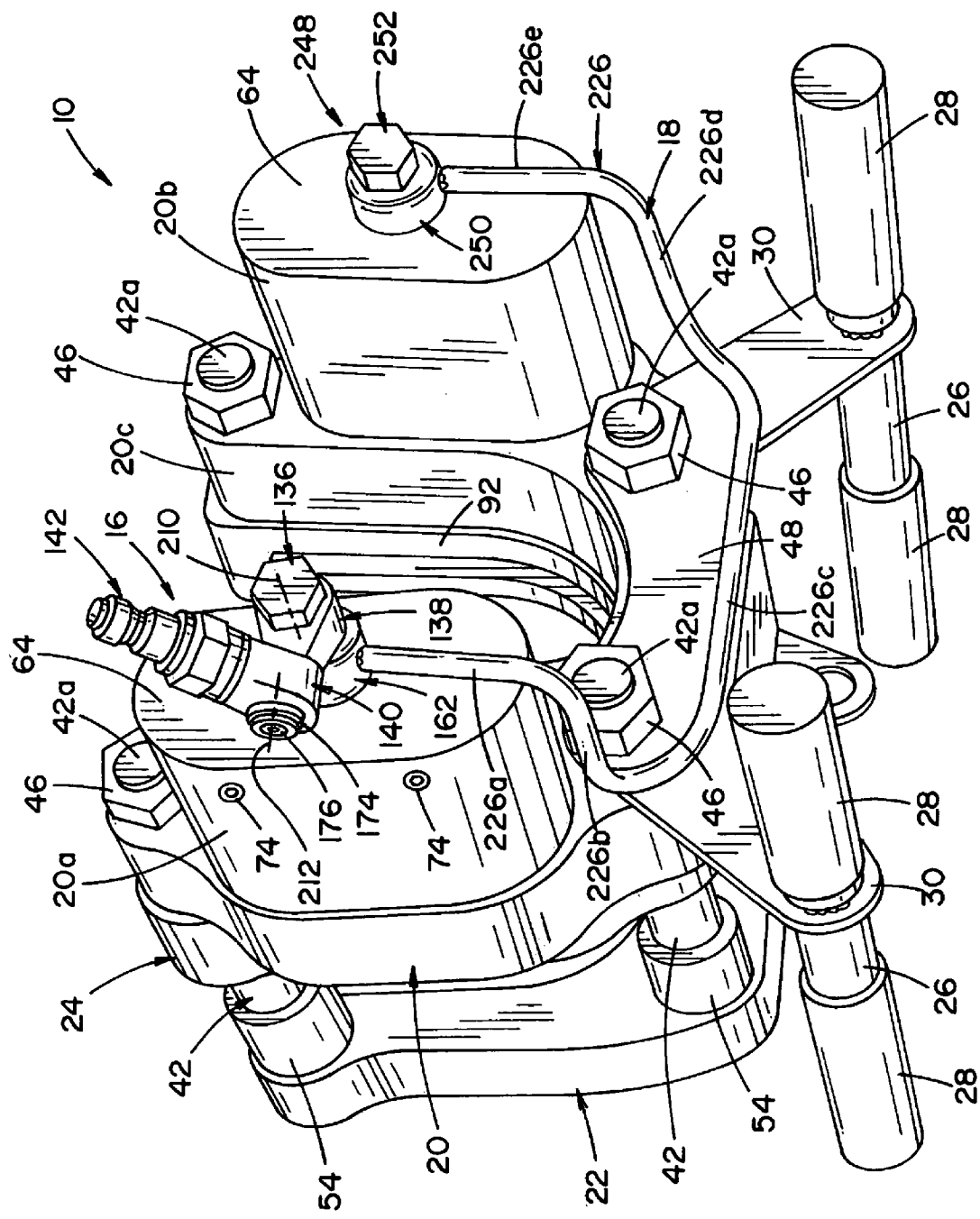
FIG. 2 is a bottom end perspective view of the installation tool assembly of FIG. 1.

Referring now to the drawings wherein the showings are for purposes of illustrating one or more embodiments only and not for purposes of limiting the same, FIGS. 1 and 2 show a hydraulic installation tool assembly for installing swage ring fittings that is generally designated by reference numeral 10. The tool assembly 10 is adapted to connect a fitting and a fluid conduit together as will be described in more detail below. More particularly, the tool assembly 10 can be used to axially move or advance a fitting's swage ring over or onto a connector body of the fitting while or when a fluid conduit is inserted or received therein to compress or plastically deform the connector body radially against an outside surface of the fluid conduit which creates one or more seals and mechanically connects the connector body to the fluid conduit.

With additional reference to FIG. 3, the tool assembly 10 can be connected to a hydraulic source 12 by a hose assembly 14, an articulating assembly 16, and a crossover assembly 18 as will be described in more detail below. In particular, the crossover assembly 18 is fluidly connectable to the hydraulic pressure source 12. In the illustrated embodiment, the hydraulic source 12 is a remotely positioned hydraulic pump, which can be driven by an electric motor (not shown), that provides hydraulic power or pressure to the tool assembly 10 through a hydraulic fluid. In one embodiment, the pump 12 can be driven by an electric motor as is generally known by those skilled in the art. "Remotely positioned" refers to the relative spacing between the tool assembly 10 and the pump 12 (i.e., the pump 12 and the tool assembly 10 are spaced apart) that is traversed by the hydraulic hose assembly 14. Alternatively, hydraulic pressure could come from any number of power sources including, for example, electric-over-hydraulic, air-over-hydraulic or even a hand pump.

Figure 4:
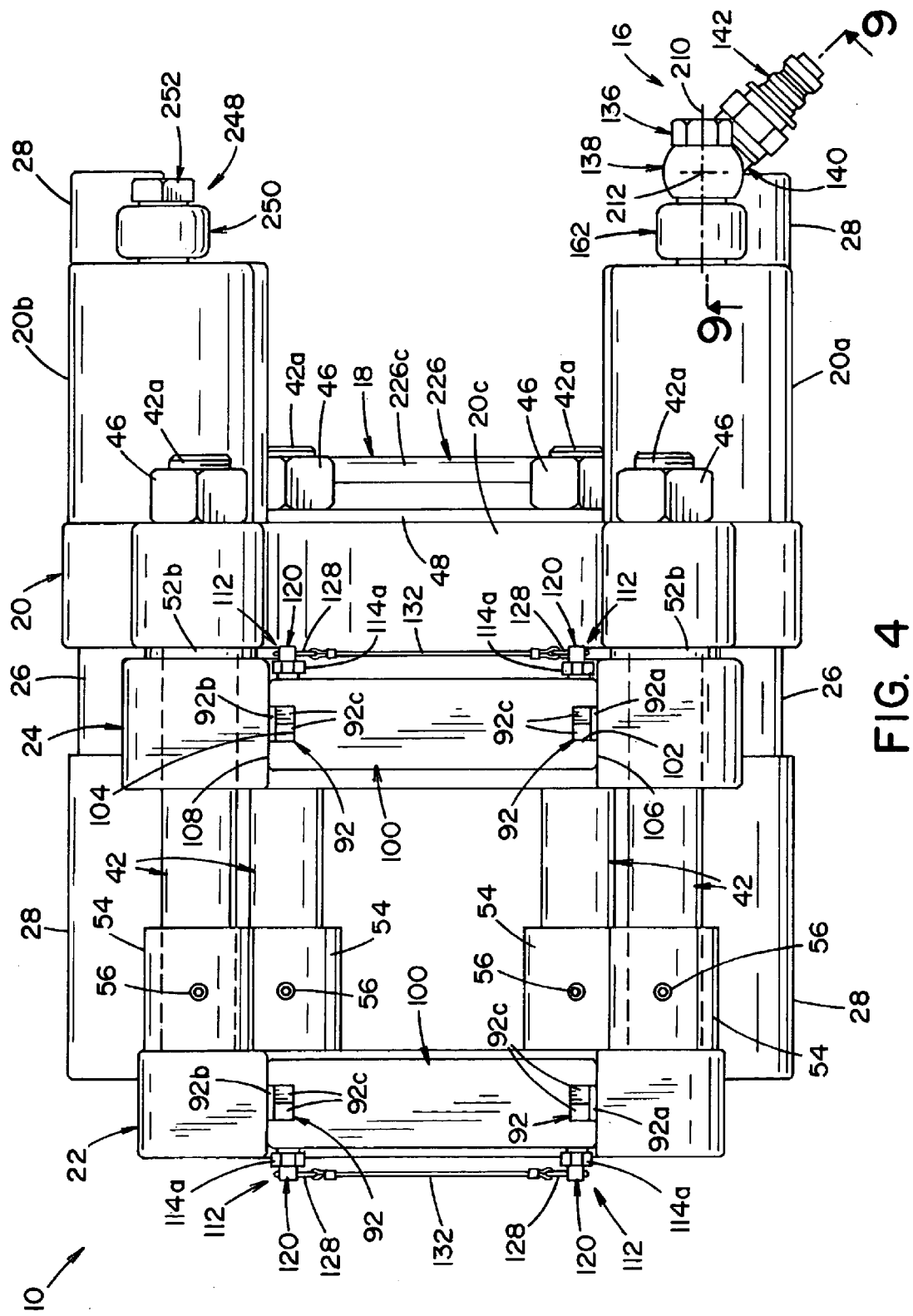
FIG. 4 is a top elevational view of the installation tool assembly of FIG. 1.

With additional reference to FIG. 4, the installation tool assembly 10 includes a base jaw or body 20, a fixed jaw 22 fixedly secured or connected to the base jaw and a movable jaw 24 connected to the body 20 and selectively movable toward the fixed jaw 22. The base jaw 20 includes a first dual-piston chamber portion 20a and a second dual-piston chamber portion 20b. A U-shaped portion 20c extends between and connects the chamber portions 20a,20b. As shown, the portions 20a,20b extend axially from the U-shaped portion 20c and are spaced apart radially from and opposite one another. As will be described in more detail below, the portions 20a,20b are adapted to receive hydraulic power via a hydraulic fluid pumped through the hose assembly 14 from the hydraulic source 12 for purposes of forcibly moving the movable jaw 24 toward the fixed jaw 22. Handles 26 including grips 28 are mounted to the base member 20 by arms 30 for ease of transporting the tool assembly 10 and providing a support structure for supporting the installation tool assembly when resting on an underlying surface.

In the illustrated embodiment, the jaws 22,24 are specifically configured for engaging the connector body of a swage ring fitting and the swage ring of the swage ring fitting to mechanically and sealingly connect the fitting to a conduit. More particularly, as discussed in more detail below, the jaws 22,24 are configured to grip the fitting's swage ring and connector body such that, upon movement of the movable jaw toward the fixed jaw as caused by the hydraulic fluid, the jaws 22,24 forcibly move the swage ring over the connector body thereby causing the connector body to compress or move into the fluid conduit to seal and mechanically connect thereto.

Figure 8:
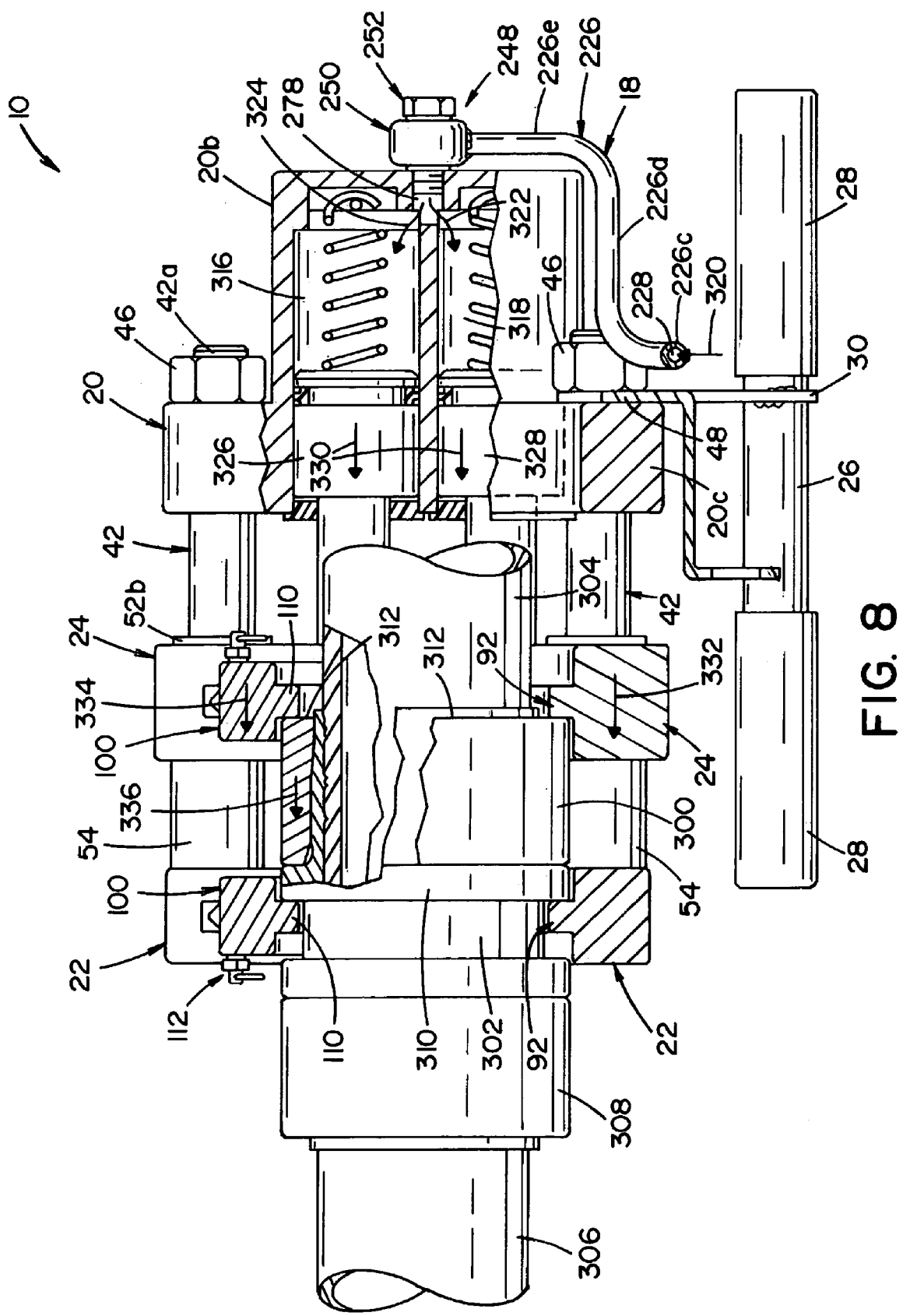
FIG. 8 is a side elevational view, partially in cross section, of the installation tool assembly of FIG. 7 showing jaws of the installation tool assembly moved toward one another to axially install the swage ring on the connector body thereby mechanically connecting and sealing the fitting to the conduit.

In the illustrated embodiment, each of the dual-piston chamber portions 20a,20b defines a plurality of adjacent (i.e., generally non-spaced apart) piston chambers. That is, the first dual-piston chamber portion 20a defines a first set of piston chambers (58,60 in FIG. 6) and the second dual-piston chamber portion 20b defines a second set of piston chambers (316, 318 in FIG. 8). As will be described in more detail below, the second set of piston chambers 316,318 are spaced apart from the first set of piston chambers 58,60 and both sets of piston chambers are fluidly connected to the hose assembly 14, and thereby the hydraulic pressure source 12. In particular, the first and second sets of piston chambers 58,60 and 316,318 are diametrically opposed to each other and positioned on opposite sides of the fluid conduit received in the fixed and movable jaws 22,24.

As will be described in more detail below, the crossover assembly 18 closely follows the contours of the body 20 and fluidly connects the spaced apart sets of piston chambers (first set 58,60 spaced apart from second set 316,318) to one another. Still further, as will also be described in more detail below, the crossover assembly 18 is fluidly connectable to the hydraulic pressure source 12 for delivering hydraulic fluid to the piston chambers 58,60 and 316,318 to move the pistons disposed in the chambers in the first direction. It is to be appreciated by those skilled in the art that the portion 20b and its piston chambers 316,318 can be the same or similar to the portion 20a and its piston chambers 58,60. Since the first and second sets of piston chambers are substantially similar, only the first set 58,60 defined within the portion 20a will be discussed in further detail herein.

Figure 6:
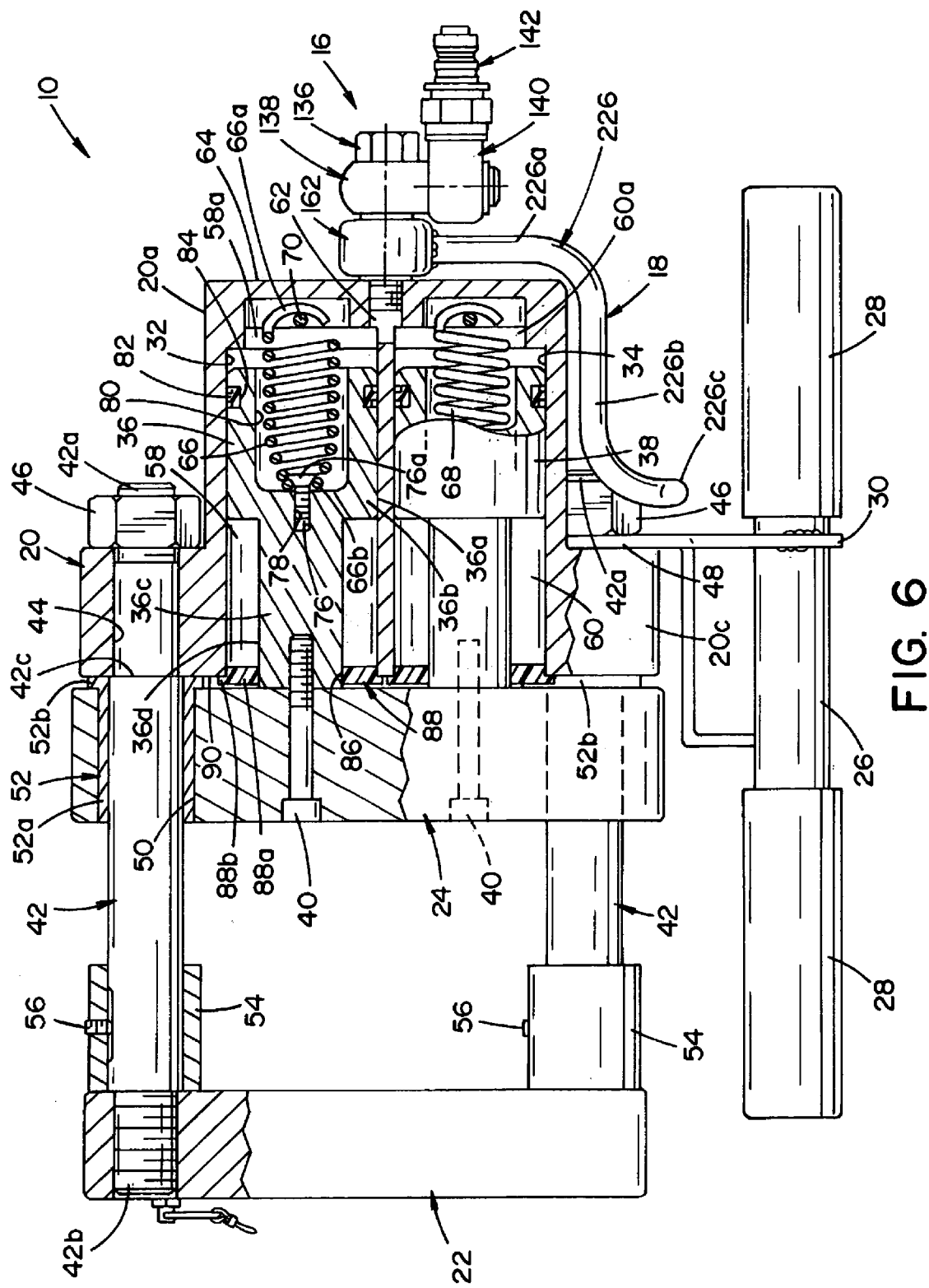
FIG. 6 is a partial cross-sectional view of the installation tool assembly taken along the line 6-6 of FIG. 5.

With additional reference to FIG. 6, the first body portion 20a defines a pair of proximal bores, including first bore 32 and second bore 34. Each of bores 32,34 substantially defines the piston chambers 58,60 of portion 20a in which pistons are operatively received for movement therein. More particularly, first piston 36 is disposed in first bore 32 (which substantially defines first chamber 58) and second piston 38 is disposed in second bore 34 (which substantially defines second chamber 60). Thus, the pistons 36,38 are respectively received or disposed in the first and second piston chambers 58,60. The pistons 36,38 and the movable jaw 24 are configured such that movement of the pistons 36,38 (and the pistons disposed in portion 20b) in a first direction moves the movable jaw 24 toward the fixed jaw. In the illustrated embodiment, the pistons 36,38 are connected to the movable jaw 24 for movement therewith. More particularly, in the illustrated embodiment, the movable jaw 24 is secured to the pistons 36,38 by threaded members or cap screws 40 to fixedly secure the jaw 24 to the pistons for movement therewith. Together, the movable jaw 24 and the pistons 36,38 are collectively referred to herein as the movable portion of the installation tool assembly 10.

The fixed jaw 22 is fixedly secured to the base member 20 in spaced relation thereto. Together, the fixed jaw 22 and the base member 20 generally form a fixed portion of the installation tool assembly 10. More particularly, in the illustrated embodiment, the fixed jaw 22 is connected to the base jaw 20 by a plurality of elongated members or tie rods 42 (i.e., the fixed jaw 22 is disposed along the tie rods 42 at a location spaced from the body 20. The tie rods 42 are generally elongated shafts each having threaded portions 42a,42b on each end thereof. The first threaded portion 42a of each tie rod 42 passes through an aperture 44 defined in the U-shaped portion 20c and is secured by a threaded fastener, such as nut 46. The second threaded portion 42b threadedly connects to the fixed jaw 22. A shoulder 42c is provided along each tie rod 42 for limiting axial movement of the tie rod into the U-shaped portion 20c. The lower two tie rods 42 (i.e., those relatively closer to the handles 26) and their corresponding nuts 46 are additionally used to mount the handle 26 to the portion 20c via the arms 30. More particularly, the arms 30 form part of a bracket 48 which is secured to the portion 20c by the lower tie rods 42 and their respective nuts 46. The bracket 48 includes a flange portion 48a having an aperture 48b therein which can be used as a connection point for associated housing equipment, as is known and understood by those skilled in the art, so that the tool 10 can be positioned by means of a lifting device.

The tie rods 42, also referred to herein as guide rods, additionally serve to provide guidance to the movable jaw 24 (i.e., the tie rods 42 provide a track along which the movable jaw 24 is movable). More particularly, the movable jaw 24 includes apertures 50 through which the tie rods 42 are received. Thus, the movable jaw is disposed along the tie rods 42 between the fixed jaw 22 and the body 20 for movement therealong. Bushings 52 are optionally positioned in the apertures 50 radially between the movable jaw 24 and each of the tie rods 42 for guiding movement of the movable jaw 24 along the tie rods 42. As illustrated, the tie rods 42 generally extend from the base member 20 in parallel relation to the movement of the pistons 36,38 and axially in a direction opposite that of the first and second portions 20a,20b extending axially from the portion 20c. The bushings 52 can include sleeve portions 52a and radial head portions 52b. The radial head portions 52b can be disposed between the movable jaw 24 and the base jaw 20 thereby maintaining the jaws 20,24 in slightly spaced relation to one another.

Spacers or stops 54 are fixedly secured to the tie rods 42 adjacent the fixed jaw 22 for purposes of providing or forming a travel stop against the moving jaw 24, particularly when the moving jaw is advancing toward the fixed jaw without an associated fitting therebetween. Threaded members or set screws 56 can be employed to fixedly secure the spacers 54 in the appropriate location on the tie rods 42 adjacent the fixed jaw 22. In operation, when the moving jaw 24 is approaching the fixed jaw 22, particularly when no associated fitting is provided between the jaws 22,24, the stops 54 engage the moving jaw 24 and prevent further movement toward the fixed jaw 22.

A mechanical force for swaging a fitting received between the jaws 22,24 comes from the pistons 36,38 in the portion 20a and the similar pistons in the portion 20b. More particularly, hydraulic fluid chambers are formed adjacent one end of each of the pistons. For example, as shown, a portion of the body member 20a and the piston 36 forms a first hydraulic chamber portion 58a (a portion of chamber 58) for receiving hydraulic fluid from the hydraulic pressure source. Likewise, another portion of the body member 20a and the piston 38 forms a second hydraulic chamber portion 60a (a portion of chamber 60) also for receiving hydraulic fluid from the hydraulic pressure source. As will be appreciated by those skilled in the art, hydraulic chamber portions are formed within the chambers 316,318 of portion 20b.

When sufficient hydraulic fluid is received in the chamber portions, including chamber portions 58a,60a, the pressurized hydraulic fluid forcibly moves the pistons, including pistons 36,38, toward the fixed jaw 22 and thereby forcibly moves the movable jaw 24 toward the fixed jaw since the pistons are fixedly secured to the fixed jaw (i.e., forming the tool movable portion). The hydraulic fluid enters the first set of piston chamber portions 58a,60a of portion 20a through a fluid port 62 defined in portion 20a adjacent a proximal end 64 thereof (proximal end 64 is also the proximal end of the base member 20). Thus, the fluid port 62 is fluidly connected to the chamber portions 58a,60a and the hydraulic source 12. More particularly, the fluid port 62 delivers pressurized hydraulic fluid generated by the source 12 into the chamber portions 58a,60a and against the pistons 36,38 to move the pistons and thereby the movable jaw 24 in the direction of the hydraulic force, i.e., toward the fixed jaw 22.

Tension springs 66,68 are disposed in respective bores 32,34 between respective pistons 36,38 and the proximal end 64 of the body portion 20a. The springs 66,68 urge the pistons 36,38 in a direction opposite the hydraulic force, i.e., toward the proximal end 64, thereby generally urging the movable jaw 24 toward a first position wherein it is positioned adjacent the base member 20. Thus, when no or an insufficient hydraulic force is applied to the pistons 36,38, the springs 66,68 urge or move the tool movable portion 24,34,36 toward the proximal end 64 and/or holds the movable jaw 24 adjacent the base member 20. Only when a hydraulic force is applied to the pistons 36,38 that is sufficient to overcome the urging of the springs 66,68 is the movable jaw 24 urged or moved toward the fixed jaw 22.

Figure 5:
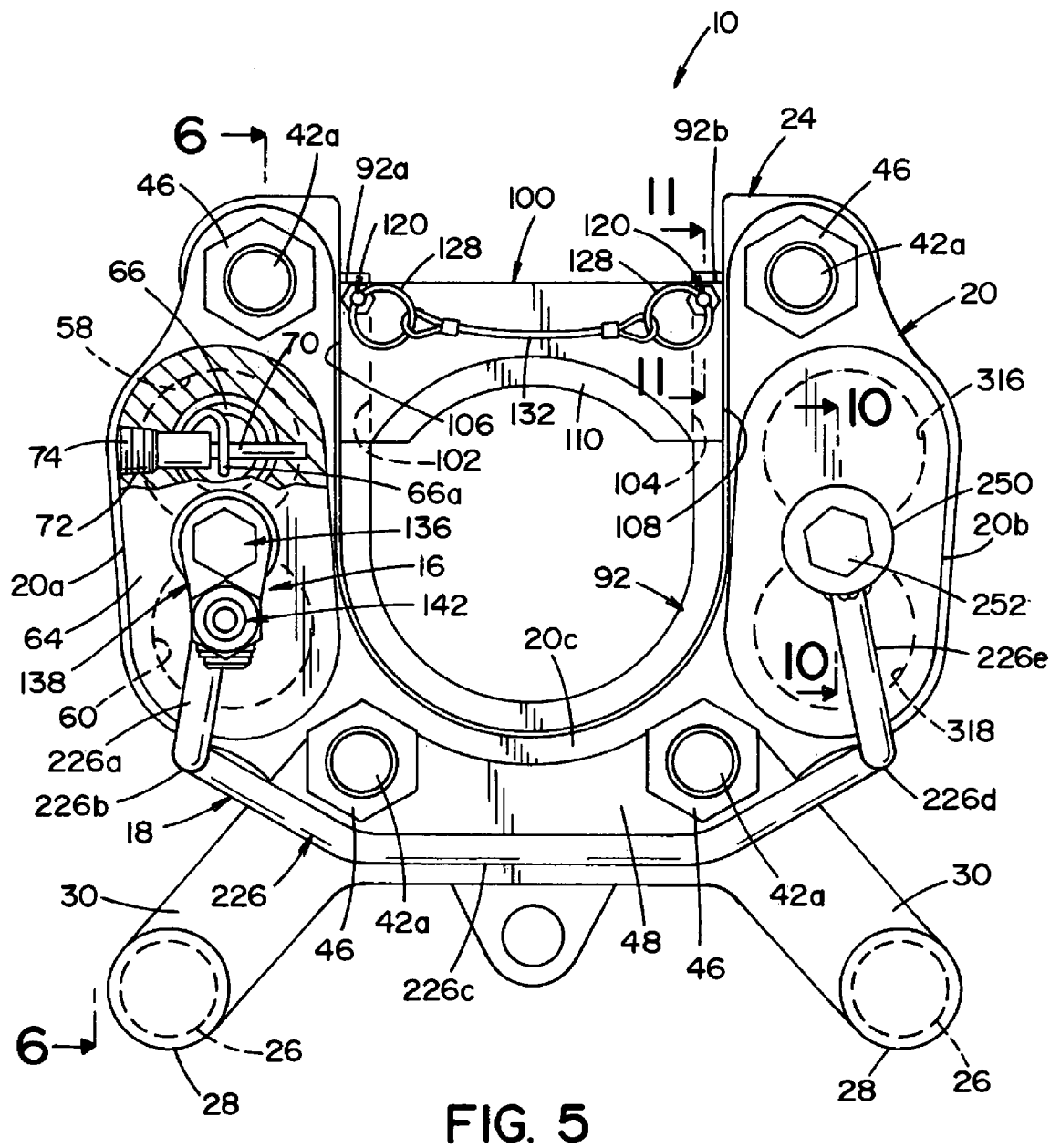
FIG. 5 is an end elevational view of the installation tool assembly of FIG. 1.

Both springs 66,68 are secured to their respective pistons 36,38 and the portion 20a in the same manner and only one will be described in further detail herein. With particular reference to FIGS. 5 and 6, a first end 66a of spring 66 is secured to the portion 20a adjacent the proximal end 64 by a spring pin 70. As shown, the spring pin 70 extends into the chamber 58 adjacent the proximal end 64 and is hooked onto by the spring first end 66a. The spring pin 70 is threadedly engaged at 72 into the portion 20a for secure mounting thereto. Optionally, a cap or plug 74 (see FIGS. 1 and 2), such as an MPT threaded plug, can be disposed over the spring pin 70 and/or formed integrally therewith for covering and/or further sealing the opening required for inserting or installing the spring pin 70.

A second end 66b of the spring 66 is coiled around head 76a of threaded fastener 76. The fastener 76 secures the second end 66b of spring 66 to the piston 36. As shown, the threaded fastener 76 is threadedly received within a threaded bore 78 defined in the piston 36. In the illustrated embodiment, the spring 66 is at least partially received within a threadless internal bore 80 defined in the piston 36 for maintaining the spring in an axially centered position relative to the piston 36.

Seals are provided about each of the pistons 36,38 for sealing purposes, i.e., to prevent hydraulic fluid from escaping from the chambers 58,60 and to prevent debris from entering the chambers. Only the seals about the piston 36 are described in further detail herein but it should be appreciated by those skilled in the art that the same or similar seals can be provided about the piston 38. More particularly, a hydraulic seal 82 is annularly disposed about the piston 36 and radially positioned between the piston and the portion 20a defining the bore 32 for preventing hydraulic fluid received in the bore from passing thereby. In the illustrated embodiment, the seal 82 is a T-shaped seal disposed in a circumferential groove 84 defined in a piston first outer or circumferential surface 36a.

The first outer surface 36a is defined about a proximal portion 36b of the piston that has a larger diameter than a distal portion 36c of the piston. The distal portion 36c protrudes from the proximal portion 36b and is capable, in the illustrated embodiment, of extending beyond the base member 20 when the piston is hydraulically moved. As shown, the threadless bore 80 can be defined within the proximal portion 36b. Also in the illustrated embodiment, the distal portion 34c is generally concentric with the proximal portion 36b. The distal portion 34c includes a second outer or circumferential surface 36d that is appropriately sized to snugly fit within an aperture 86 defined within a dust cap 88 secured to a distal end 90 of the base member 20. The dust cap 88 covers any exposed opening of the bore 32 not filled or occupied by the piston 36 and serves to keep dirt and/or debris out of the piston chamber 58. In the illustrated embodiment, the dust cap 88 has a receiving portion 88a at least partially received in the bore 34 and a head portion 88b received against the distal end 90 for preventing further axial insertion of the cap 88 into the bore 34.

In the illustrated embodiment, each of the jaws 22,24 is generally U-shaped and includes a raised member or ridge 92. As will be described in more detail below, the ridges 92 of the jaws 22,24 can be used to engage one of (i) a raised member (also referred to herein as a radial flange) on a fitting body or (ii) an end of a swage ring. Thus, the movable jaw 24 and the fixed jaw 22 can together engage the swage ring and fitting body for purposes of forcibly moving the swage ring onto the fitting body with a fluid conduit or the like received therein when the movable jaw 24 is moved or closed toward the fixed jaw 22. Generally, although not necessarily, the ridge 92 on the fixed jaw 22 engages the raised member of the fitting body and the ridge 92 on the movable jaw 24 engages the end of the swage ring. In such an application, movement of the movable jaw 24 under a hydraulic force forcibly moves the swage ring onto the connector body to seal and mechanically connect the connector body to the fluid conduit received therein.

As shown, a bridge member or assembly 100 can be removably secured to each of the jaws 22,24 and thereby can form a portion of each of the respective jaws. The details of the bridge members 100 and manner in which they are secured to respective jaws 22,24 is generally the same or similar and will only be described in further detail with reference to the movable jaw 24. However, it is to be appreciated by those skilled in the art that the bridge member 100 (the first bridge member) of the fixed jaw 22 can be and can function the same or similarly to the bridge member (the second bridge member) of the movable jaw 24. As illustrated, the movable jaw bridge member 100 extends across the open end of the U-shaped jaw 24 and thereby provides a circumferentially continuous structure for encircling and/or engaging a fitting. That is, the bridge members 100, together with the fixed and movable jaws 22,24, circumferentially surround a fitting and corresponding conduit received in the jaws.

More particularly, bridge member 100 includes opposed slots 102,104 extending along lateral sides 106,108 thereof for receiving the U-shaped ridge 92 of the jaw 24 to axially lock the bridge member relative to the jaw. The removable connection of the bridge member allows for detachment from the jaw 24 when desirable to remove or install a fitting component, swage ring or connector body within the jaw 24 and reattachment when desirable to encircle the fitting component and operate the tool assembly 10 thereon.

Figure 11:
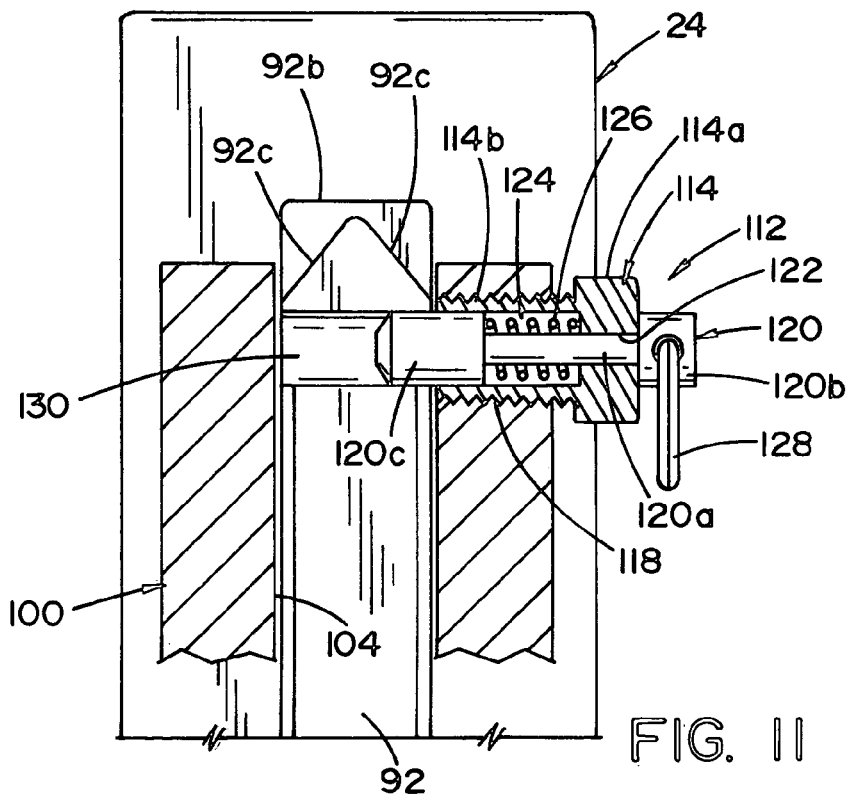
FIG. 11 is a partial cross-sectional view of the installation tool assembly taken along the line 11-11 of FIG. 5.

The bridge member 100, also referred to herein as an insert or a jaw insert, includes a raised member or ridge portion 110 (see also FIG. 7) that, like the ridges 92 of the jaws, can be used to engage one of (i) a raised member on a fitting body and (ii) an end of a swage ring. The bridge member 100 includes a locking mechanism that can be used to selectively secure and lock the bridge member 100 to the movable jaw 24, particularly to restrict radial removal of the bridge member 100 from the jaw 24. In the illustrated embodiment, with further reference to FIG. 11, the locking device is a pair of spring plunger assemblies 112 (only one shown in FIG. 11) for selectively securing and locking the bridge member 100 to the movable jaw 24, as will be described in more detail below. Of course, as will be appreciated by those skilled in the art, other types of locking devices could be employed, including locking devices provided on the jaw for locking to the bridge member, provided on the bridge member for locking to the jaw, such as the illustrated plunger assemblies 112, and/or provided on both the bridge member and the jaw.

Each spring plunger assembly 112 includes a threaded plug 114 having a hexagonal head 114a and a threaded shaft portion 114b. In the illustrated embodiment, the threaded shaft portion 114b is threadedly engaged to a body portion of the bridge member 100 at 118. The plunger assembly 112 further includes a plunger 120 having a shaft portion 120a received through an aperture 122 in the head 114a, a head 120b appropriately sized to be larger than the aperture 122 and limit axial movement of the plunger 120 into the head 114a, and a plunger portion 120c disposed on an end of the shaft portion 120a opposite the head 120b.

The shaft portion 120a and the plunger portion 120c are at least partially received in bore 124 defined into the threaded shaft portion 114b. Further, the shaft portion 120a has a diameter smaller than the bore 124 and the plunger portion 120c has a diameter corresponding to (i.e., the same or only slightly smaller) that of the bore 124. A compression spring 126 is disposed within the bore 124 and axially between the plug head 114a and the plunger portion 120c to urge the plunger portion 120c toward an extended or protruding position, i.e., away from the head 114a, wherein the plunger portion 120c extends into its respective groove 102,104. A pull ring 128 can be provided on the head 120b as shown to assist in moving the plunger 120 relative to the plug 114, particularly for moving the plunger portion 120c against the urging of the spring 126 into a retracted position wherein the plunger portion 120c no longer extends into the respective groove 102,104.

The ridges 92 on each of the jaws 22,24 can be provided with apertures, such as notches 130, located adjacent both ends 92a,92b of each ridge 92. The notches 130 can be appropriately sized for selective receipt of the plungers 120, and particularly the plunger portions 120c, of the spring plunger assemblies 112. Further, ends 92a,92b of the ridges can be provided with opposed tapered surfaces 92c for guiding the plunger portion 120c toward the retracted position when the bridge member 100 is installed onto the jaw 24. A lanyard 132 can be provided for connecting pull rings 128 disposed on a common bridge member 100. The lanyard 132 enables quick and simultaneous (or almost simultaneous) removal of the plunger portions 120c from their respective notches 130 against the urging of the respective springs 126.

Figure 3:
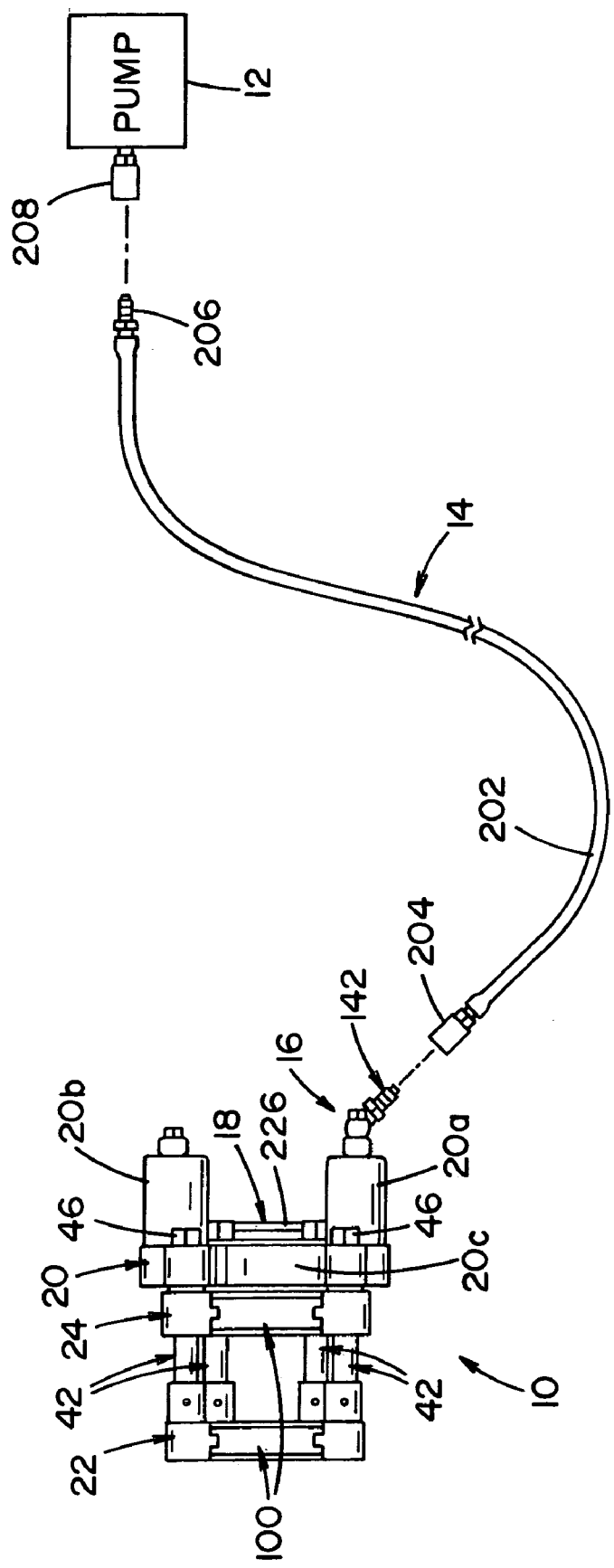
FIG. 3 is a schematic plan view of the installation tool assembly of FIG. 1 shown with a single elongated hose for connecting the installation tool assembly to a pump.

With reference now to FIGS. 3 and 6, the articulating assembly 16, also referred to herein as a swivel assembly, fluidly connects the fluid port 62 to the hose assembly 14 and rotatably connects the body 20 (including portions 20a and 20b) and the crossover assembly 18 to the hose assembly 14. In particular, the articulating assembly 16 enables the installation tool assembly 10 and the hose assembly 14 to be moved relative to one another about at least two axes. More particularly, the articulating assembly 16 allows the body 20 and the crossover assembly 18 to be rotated about a first axis relative to the hose assembly 14 and allows the body 20 and the crossover assembly 18 to be rotated about a second axis relative to the hose assembly 14, wherein the second axis is angularly disposed, and preferably oriented approximately normal, relative to the first axis.

In the illustrated embodiment, the articulating assembly 16 includes a swivel adapter 136 received in the fluid port 62, a first swivel 138 rotatably connected to the swivel adapter, a second swivel 140 rotatably connected to the first swivel and a connector 142 for connecting to the hose assembly 14 (alternatively, the connector 142 can be considered a separate element from the crossover assembly 18 and/or provided on the portion 20a without the articulating assembly 16, i.e., the articulating assembly 16 can be excluded from the tool assembly 10). The connector 142 is the only (i.e., a single) connector provided on the tool assembly 10 for fluidly connecting to the pump 12 through the hose assembly 14. As will be described in more detail below, the hydraulic connector 142 is in fluid communication with both sets of piston chambers through the crossover assembly 18.

Figure 9:
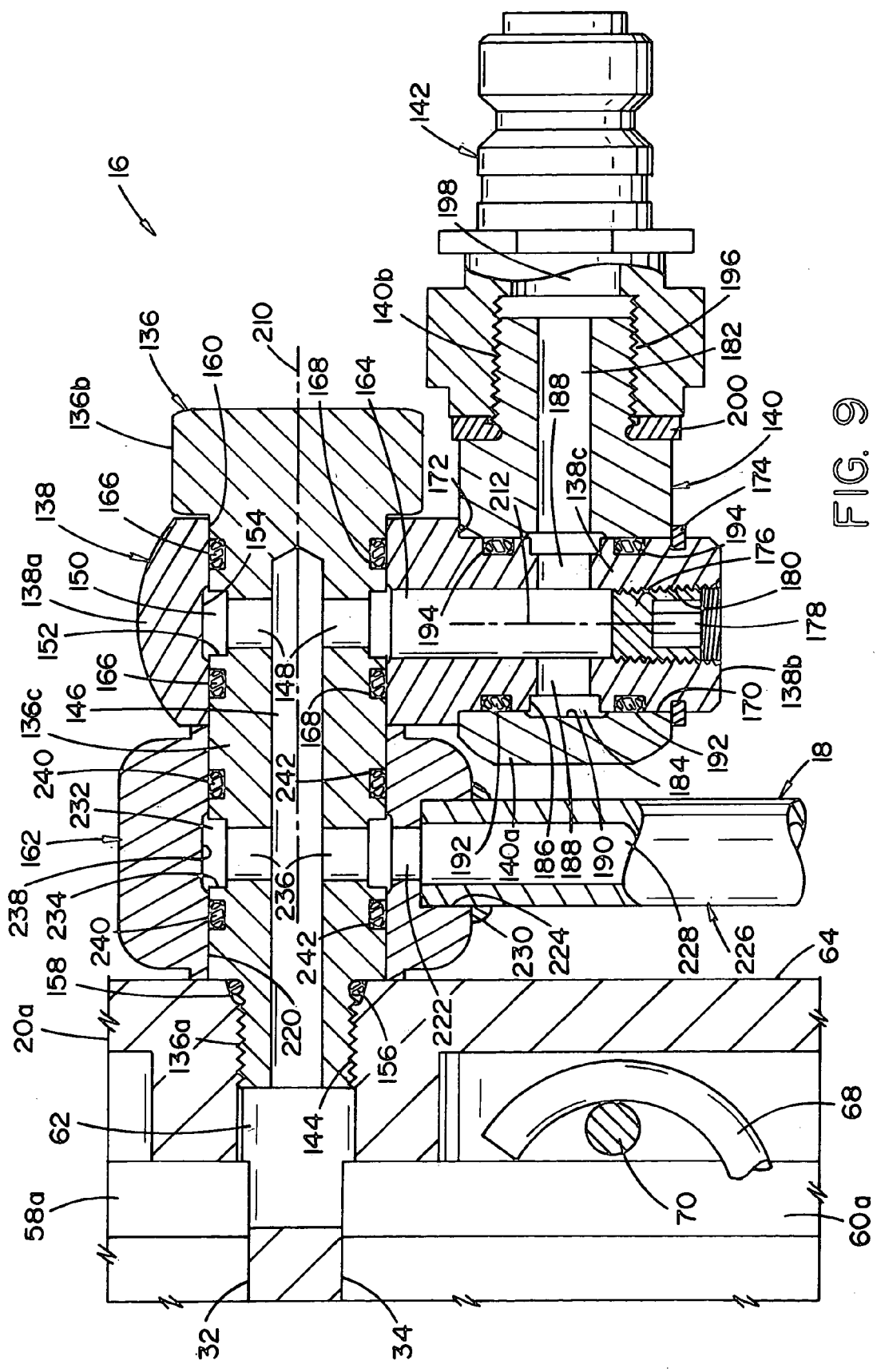
FIG. 9 is a partial cross-sectional view of the installation tool assembly taken along the line 9-9 of FIG. 4.

More particularly, with additional reference to FIG. 9, the swivel adapter 136 is fixedly secured to the base portion 20a and extends from the fluid port 62. In the illustrated embodiment, the swivel adapter 136 includes a threaded end 136a that is received in the fluid port 62 and threadedly engaged with the portion 20a at 144. The swivel adapter 136 additionally includes a head portion 136b and a shaft portion 136c. A bore or passage 146 extends into the threaded end 136a and extends along the shaft portion 136c. A plurality of radially extending passages 148 fluidly connect the passage 146 to an annular chamber 150 defined by a circumferential groove 152 in the shaft portion 136c. The chamber 150 can additionally be defined by a groove 154 extending into portion 138a of the first swivel 138 to better facilitate fluid communication between the swivel adapter 136 and the first swivel 138. A seal 156, such as an O-ring seal, can be provided between the swivel adapter 136, particularly the threaded portion 136a in the illustrated embodiment, and the portion 20a, particularly a tapered entrance 158 to the port 58.

The first swivel 138 is rotatably connected to the swivel adapter 136. More particularly, the first portion 138a of the first swivel 138 includes an aperture 160 through which the swivel adapter 136 is received. The first swivel 138 is limited from axial movement along the shaft portion 136c by its positioning between the head portion 136b and an attaching member 162 of the crossover assembly 18. A bore or passage 164 extends into an end 138b of the first swivel 138 and extends to the aperture 160 or at least the groove 154 forming chamber 150. The passage 164 and the annular chamber 150 are aligned so that fluid communication is maintained between the annular chamber 150 and the passage 164 thereby enabling fluid communication between the passage 146 and the passage 164 via the chamber 150 and the radial passages 148. O-ring seals 166 are received in circumferential grooves 168 axially flanking the circumferential groove 152 to seal fluid communication between the passages 146, 164.

The second swivel 140 is rotatably connected to the first swivel 138. More particularly, the second swivel 140 includes an aperture 170 through which a second portion 138c of the first swivel 138 is received. A shoulder 172 defined between the portions 138a,138c limits movement of the second swivel 140 along the first swivel 138 and a retaining ring 174 further limits movement of the second swivel along the first swivel. A threaded member 176 having a tool recess 178, such as a hexagonal tool recess, is threadedly engaged into the first swivel 138 at 180 adjacent the first swivel end 138b to close or seal one end of the passage 164. As is known to those skilled in the art, a tapered thread system known to be fluid tight can be used between the threaded member 176 and the first swivel 138.

A bore or passage 182 extends into an end (the end adjacent the connector 142) of the second swivel 140 and extends to the aperture 170. The passage 182 is aligned with an annular chamber 184 defined by a circumferential groove 186 in the portion 138*b* of the first swivel 138. A plurality of radially extending passages 188 fluidly connect the passage 164 of the first swivel 138 to the annular chamber 184. The passage 182 and the annular chamber 184 are aligned so that fluid communication is maintained between the annular chamber 184 and the passage 182 thereby enabling fluid communication between the passage 164 and the passage 182 via the chamber 184 and the radial passages 188. The chamber 184 can additionally be defined by a groove 190 extending into second swivel portion 140*a* to better facilitate fluid communication between the first and second swivels 138,140. O-ring seals 192 are received in circumferential grooves 194 axially flanking the groove 186 to seal fluid communication between the passages 164,182.

The hydraulic connector 142 threadedly connects to a threaded portion 140*b* of the second swivel 140 at 196. The connector 142 includes a throughhole 198 fluidly connected to the passage 182. A metal-backed rubber seal 200 can be provided between the connector 142 and the second swivel 140 to prevent leakage of hydraulic fluid between the components 140,142. In the illustrated embodiment, the connector 142 is a conventional male quick-disconnect connector that enables the articulating assembly 16 to be easily connected to the hose assembly 14.

With additional and specific reference to FIG. 3, the hose assembly 14 includes only a single elongated hose 202 (a fifteen foot hose in one embodiment) having a conventional female quick-disconnect connector 204 at one end for fluidly and mechanically connecting to the connector 142 and for connecting the sets of piston chambers to the pump 12. Thus, when the female connector 204 is coupled to the connector 142, fluid communication is established between hose 202 and the articulating assembly 16 (specifically, the passage 182 and the hose 202). The other end of the hose 202 includes another connector 206 (a conventional male quick-disconnect connector) for fluidly and mechanically connecting to a corresponding connector 208 (a conventional female quick-disconnect connector) of the pump 12.

When the corresponding connectors 206,208 and 142,204 are secured to one another, fluid communication is established between the pump 12 and the tool assembly 10. As should be appreciated by those skilled in the art, fluid communication between the hose assembly 14 and the articulating assembly 16, when connected together, is maintained irrespective of the positions of (i) the first swivel 138 relative to the swivel adapter 136 and (ii) the second swivel 140 relative to the first swivel. Thus, the articulating assembly 16 allows continuous fluid communication between the hose assembly 14 and the base portion 20 while simultaneously allowing movement about two axes 210,212 (first axis 210 defined by the swivel adapter 136 and second axis 212 defined by the first swivel 138).

The crossover assembly 18, also referred to herein as a fluid communicating mechanism, includes the attaching member 162, also referred to herein as a first attaching member, which fluidly connects to the articulating assembly 16 and, more specifically, to the swivel adapter 136. The attaching member 162 is adjacent and fluidly connected to the first set of piston chambers 58,60. The crossover assembly 18 directs fluid from the hydraulic pressure source 12 in equal proportions to each of the spaced apart sets of piston chambers 58,60 and 316,318, as will be described in more detail herein.

More specifically, the attaching member 162, also referred to herein as the connecting portion, includes an aperture 220 through which the swivel adapter 136 is received. The attaching member 162 is positioned on the shaft portion 136*c* between the first swivel 138 and the base portion 20 such that it is limited from axial movement and limits axial movement of the first swivel 138. The attaching member 162 includes a passage 222 and a bore 224 for receiving a tubular connector 226. More particularly, the tubular connector 226 has a passage 228 that fluidly communicates with the passage 222 when the tubular connector 226 is received in the bore 224. The tubular connector 226 can be securely connected to the attaching member 162 via welding 230.

The passage 228 is aligned with an annular chamber 232 defined by a circumferential groove 234 in the portion 136*c* of the swivel adapter 136. A plurality of radially extending passages 236 fluidly connect the chamber 232 to the passage 146 extending along the swivel adapter 136. Thus, alignment between the passage 222 and the chamber 232 ensures that fluid communication will be maintained between the passage 228 and the passage 146 via the chamber 232, the passage 222 and the radial passages 236. The chamber 232 can additionally be defined by a groove 238 extending into the attaching member 162 to better facilitate fluid communication between the attaching member 162 and the swivel adapter 136. O-ring seals 240 are received in circumferential grooves 242 axially flanking the groove 234 to seal fluid communication between the passages 146,222. The connection described herein of the tubular connector 226 to the swivel adapter 136 and thereby to the portion 20*a* provides an improved connection that remains fluid tight even when the tool assembly 10 operates under high hydraulic pressures, such as about 10,000 psi (pounds per square inch).

In the illustrated embodiment, the tubular connector 226 is a rigid tube that connects the portions 20*a* and 20*b* and fluidly connects the first set of piston chambers 58,60 defined in portion 20*a* to the second set of piston chambers 316,318 defined in portion 20*b*. The tube 226, also referred to herein as a rigid tubular connector, can be formed of steel tubing and, preferably, hugs or closely follows (i.e., is closely adjacent) the contour of the base jaw 20. That is, the tube 226 is positioned close to and extends along the portion 20*a*, then is positioned close to and extends along the portion 20*c* and finally is positioned close to and extends along the portion 20*b* prior to fluidly connecting with the second set of piston chambers 316,318.

Specifically, the tube 226 includes a first section 226*a* that extends along the proximal end 64 of the portion 20*a* and a second section 226*b* extending along an axial length of the portion 20*a*. A third section 226*c* bridges or crosses between the portions 20*a*,20*b*. The tube 226 further includes a fourth section 226*d* that extends along an axial length of the portion 20*b* and a fifth section 226*e* that extends along a proximal end of the portion 20*b*. The close relation of the tube 226 to the base member 20 (i.e., the crossover tube generally hugs or closely follows the contour of the base member) removes the tube 226 from a compromised position wherein it might be more prone to damage. For example, if the tube 226 were more spaced relative to the base member 20 it could be used as a handle subjecting the fluid connections to undue stress.

Figure 10:
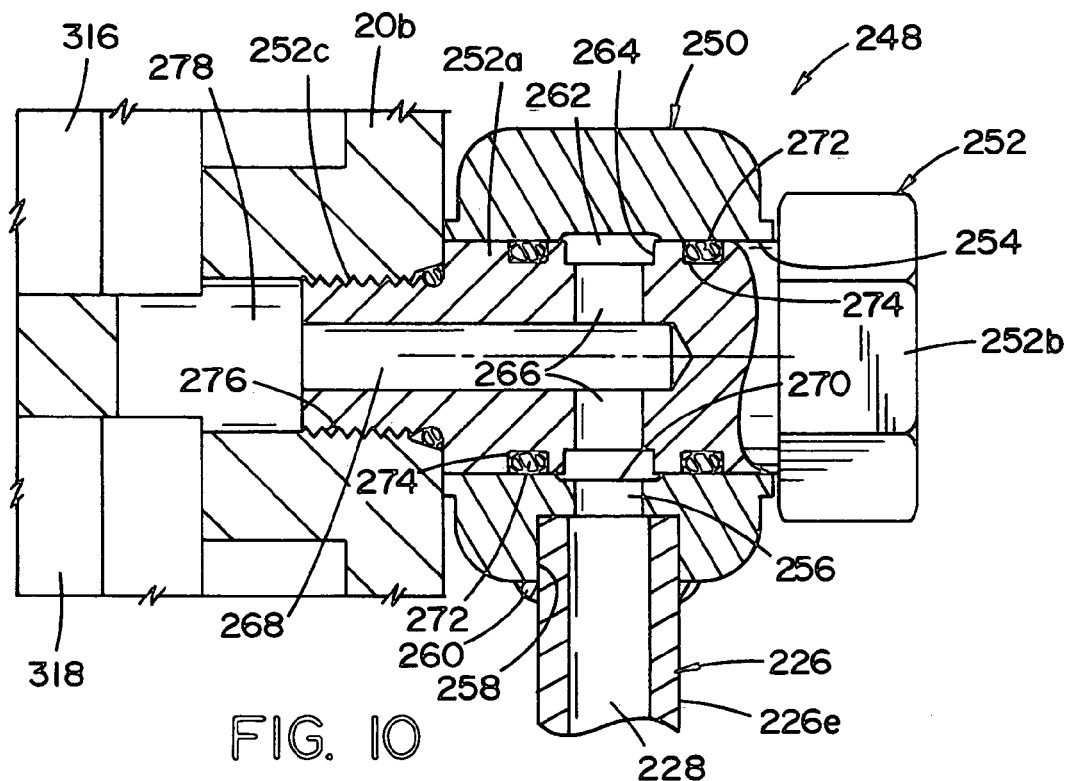
FIG. 10 is a partial cross-sectional view of the installation tool assembly taken along the line 10-10 of FIG. 5.

With additional reference to FIG. 10, the other end of the tubular connector 226 (i.e., the end opposite the attaching member 162) connects to the portion 20*b* through a connecting assembly 248. The connecting assembly 248 fluidly and mechanically connects the tubular connector 226 to the portion 20*b*, thereby forming a second end connection. The connecting assembly 248 includes a connecting portion or attaching member 250 and an adapter 252. The attaching member 250, also referred to herein as a second attaching member, includes an aperture 254 through which the adapter 252 is received. The attaching member 250 is positioned on a shaft portion 252a of the adapter between a head portion 252b and the base portion 20b such that axial movement of the attaching member 250 along the adapter is limited or substantially prevented. The attaching member 250 includes a passage 256 for fluidly communicating with the adapter 252 and a bore 258 that receives the tubular connector 226 such that the passage 228 is fluidly connected to the passage 256. Thus, as shown, the second attaching member 250 is adjacent and fluidly connected to the second set of piston chambers 316, 318 and, as illustrated, the tube 226 fluidly connects the first attaching member 162 to the second attaching member 250. The tubular connector 226 can be securely connected to the attaching member 250 via welding 260.

The passage 256 is aligned with an annular chamber 262 defined by a circumferential groove 264 in the shaft portion 252a. A plurality of radially extending passages 266 fluidly connect the chamber 256 to a passage 268 extending along the adapter 252. The alignment between the passage 256 and the chamber 262 ensures fluid communication will be maintained between the passage 228 and the passage 268 via the passage 256, the chamber 262, and the radial passages 266. The chamber 262 can additionally be defined by a groove 270 extending into the attaching member 250 to better facilitate fluid communication between the portion 196 and the adapter 198. O-ring seals 272 are received in circumferential grooves 274 axially flanking the groove 264 to seal fluid communication between the components 250,252.

The adapter 252 includes a threaded portion 252c that threadedly connects to the portion 20b at 276 and further includes a fluid port 278 which is fluidly connected to the second set of piston chambers 316,318 defined in the portion 20b. The connection described herein of the tubular connector 226 to the adapter 252 and thereby to the portion 20b provides an improved connection that remains fluid tight even when the tool assembly 10 operates under high hydraulic pressures, such as about 10,000 psi (pounds per square inch).

Figure 7:
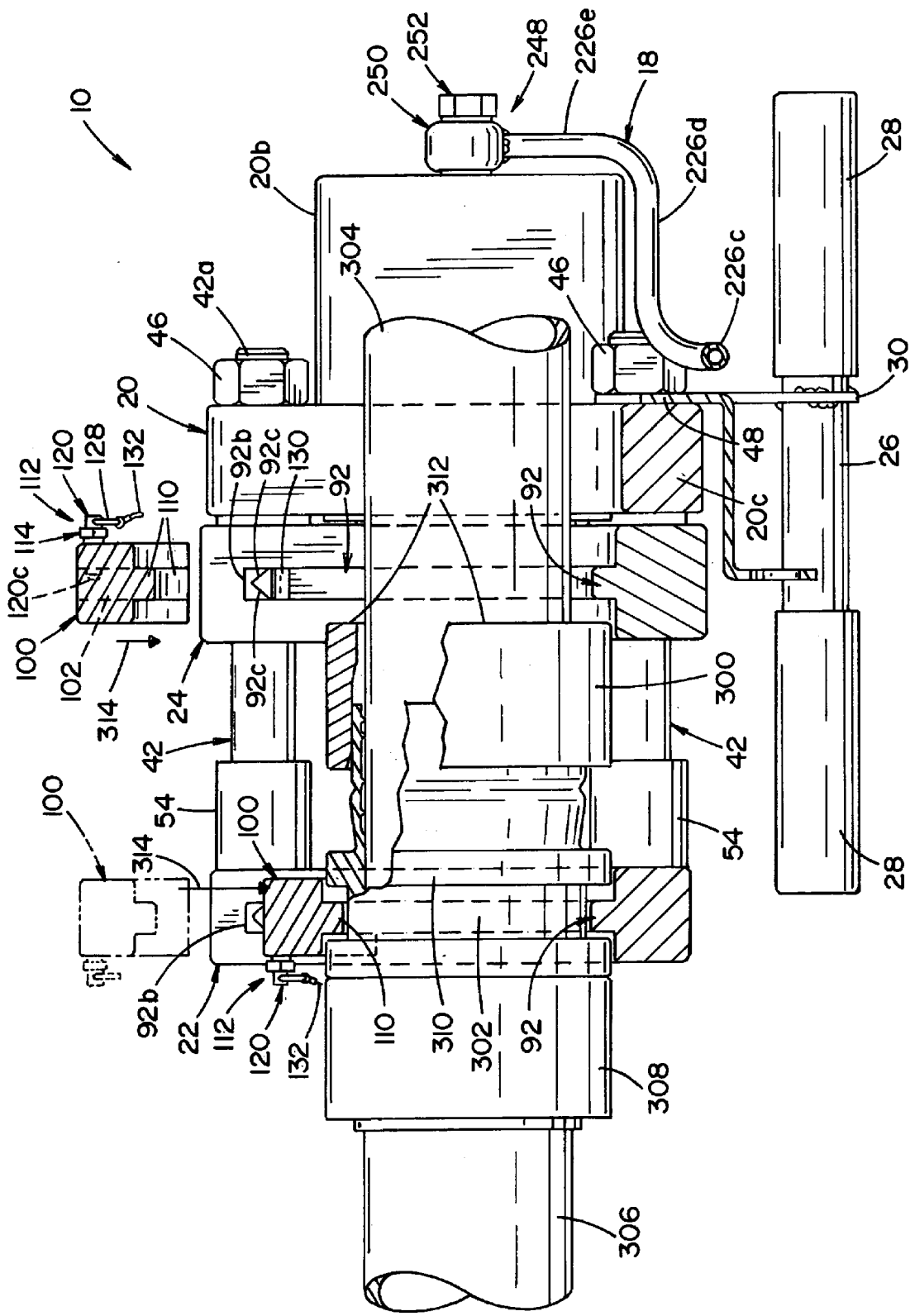
FIG. 7 is a side elevational view, partially in cross section and partially exploded, of the installation tool assembly of FIG. 1 shown with a conduit inserted into a fitting's connector body and swage ring, which is partially installed on the connector body.

As will be known and appreciated by those skilled in the art, with reference now to FIG. 7, the installation tool assembly 10 can be used for axially moving a swage ring 300 onto a fitting or connector body 302 (together the swage ring 300 and the connector body 302 comprise an associated fitting 300,302) to sealingly and mechanically connect the fitting to an associated fluid conduit 304. In operation, the fitting 300, 302 is provided with the swage ring 300 partially installed on the connector body 302 and the fluid conduit 304 received through both the connector body 302 and the swage ring 300 as illustrated in FIG. 7. In the illustrated embodiment, the fitting 300,302 is shown with a second fluid conduit 306 already secured to the connector body 302 by a second swage ring 308, as will be understood and appreciated by those skilled in the art.

With the bridge members 100 removed from their respective jaws 22,24, the subassembly, comprising the fitting 300, 302 and the fluid conduit 304, is positioned within the installation tool assembly 10, and particularly the jaws 22,24 of the tool assembly 10 as shown. That is, in the illustrated embodiment, the connector body 302 is positioned on the fixed jaw 22 such that fixed jaw ridge 92 resides outside of the connector body's radial flange 310 and the swage ring 300 is positioned on the movable jaw 24 such that movable jaw ridge 92 resides outside of the swage ring's end surface 312. Thus, the radial flange 310 and the swage ring 300 are positioned between the ridges 92 of the fixed and movable jaws 22,24 such that movement of the movable jaw 24 toward the fixed jaw 22 can result in axial movement of the swage ring 300 toward the radial flange 310.

Once the subassembly 300,302,304 is installed or positioned in the installation tool assembly 10, the bridge members 100 can be secured to the jaws 22,24. That is, each bridge member 100 can be slidably received onto its respective jaw 22,24, as indicated by arrows 314. More particularly, the opposed slots 102,104 (104 shown in FIG. 1) of the bridge member 100 receive opposed ends 92a,92b of the ridge 92 of the corresponding jaw 22 or 24 upon which the bridge member is being installed. One of the opposed tapered surfaces 92c forcibly moves the spring plunger assembly 112 against the urging of its spring 126 to its unlocked position allowing the bridge member to be fully slidably moved along the ridge 92. The opposed tapered surfaces 92c are provided on both sides of the ridge 92 to allow for insertion of the spring plunger assembly into the slot 130 from either side of the ridge 92.

When the bridge member 100 is fully installed, i.e., the plunger 120 is aligned with the notch 130, the plunger portion 120c is urged to its locked position by the spring 126 as a result of the tapered surface 92c no longer acting against the spring plunger assembly 112. In the locked position, the spring plunger assembly 112 lockingly engages the jaw and secures the bridge member 100 to the jaw. As illustrated, the raised member 110 of the bridge member 100 can be aligned with the ridge 92 for engaging a respective one of the radial flange 310 and the swage ring end surface 312. Once installed, the bridge members 100, together with their respective jaws 22,24, circumferentially surround the fitting 300, 302 and the conduit 304.

With the subassembly 300,302,304 installed in the installation tool assembly 10 and the bridge members 100 secured to the jaws 22,24, the hydraulic source 12 can be actuated to generate hydraulic pressure through hydraulic fluid and transfer this through the hose assembly 14 to the installation tool assembly 10. More particularly, hydraulic fluid is forced under pressure by the pump 12, through the hose assembly 14 and into the installation tool 10. The pressurized hydraulic fluid enters the tool 10 through the articulating assembly 16 and passes into the sets of chambers (58,60 in portion 20a and 316,318 in portion 20b) provided in the body 20.

More specifically, pressurized hydraulic fluid enters the tool assembly 10 through the hydraulic connector 142. From the connector 142, the hydraulic fluid travels through the second swivel 140 and into the first swivel 138, and on through the swivel adapter 136. While passing through the swivel adapter 136, the hydraulic fluid flow splits and goes equally to the first and second sets of piston chambers (first set of chambers 58,60 in portion 20a and second set of chambers 316,318 in portion 20b). More specifically, with additional reference to FIG. 8, the hydraulic fluid splits at the crossover assembly 16 whereby about half the hydraulic fluid continues on to the first set of piston chambers 58,60 in the portion 20a and the remaining hydraulic fluid passes through the crossover assembly 18 and into the second set of piston chambers 316,318 in the portion 20b, as indicated by arrows 320,322, 324. In the sets of piston chambers 58,60 and 316,318, the pressurized hydraulic fluid is capable of moving the pistons (36,38 in chambers 58,60 and pistons 326,328 in chambers 316,318), as indicated by arrow 330, and thereby the movable jaw 24 toward the fixed jaw 22, as indicated by arrow 332, to effect a swaging operation on the fitting 300,302 received between the jaws 22,24.

As already described, the bridge member 100 attached to the movable jaw 24, which can be said to form a circumferential continuous movable jaw 24,100, moves with the movable jaw 24, as indicated by arrow 334. Moving the sets of pistons 36,38 and 326,328 to move the jaw 24 moves the movable jaw 24 toward the fixed jaw 22 and axially moves the swage ring 300 onto the connector body 302, as indicated by arrow 336, to mechanically and sealingly connect the connector body 302 to the fluid conduit 304. Once the fitting 300,302 is secured to the conduit 304, the pump 12 can be deactivated to allow hydraulic fluid to return from the chambers 58,60 and 316,318 and thereby allow the springs provided in the chambers to return the movable jaw, via the pistons, to its position spaced apart from the fixed jaw.

To remove the fitting 300,302 and conduit 304 from the tool assembly 10, the bridge members 100 are first removed from the jaws 22,24. To remove or detach each bridge member 100 from its jaw, its lanyard 132 is pulled which in turn pulls out the spring plungers 120. With the plungers 120 removed, the bridge member 100 is simply removed from the jaw. Once the bridge members 100 are removed and the movable jaw 24 is returned to its spaced apart position, the fitting and conduit assembly 300,302,304 can be removed from the installation tool assembly 10.

As will be readily appreciated by those skilled in the art, the crossover assembly 18 of the installation tool assembly 10 provides many advantages over prior art installation tool assemblies. By closely following the contours of the body 20 when fluidly connecting and bridging the spaced piston chambers 58,60 and 316,318, the crossover assembly 18 serves as a fluid communicating mechanism that is robust, inconspicuous and less likely to interfere or get in the way of a user of the installation tool assembly 10. In forming a component of the installation tool assembly, the crossover assembly 18 enables the tool assembly 10 to be connected to a remotely positioned hydraulic pressure source, such as pump 12, with a single elongated hose.

Figure 12:
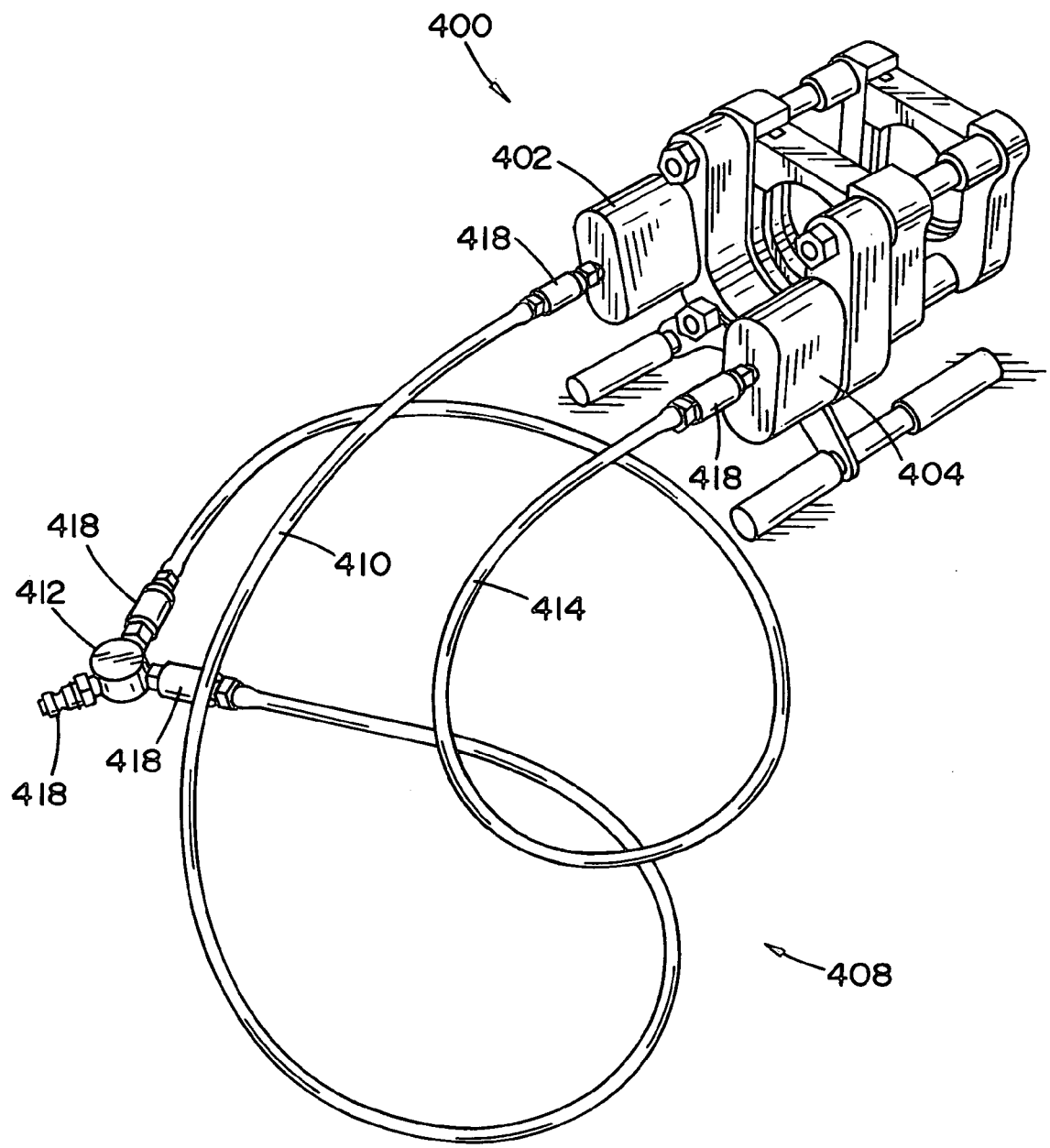
FIG. 12 is a perspective view of a prior art installation tool assembly having each of its dual piston chambers connected to a remotely positioned adapter by a pair of equal length elongated hoses.
Figure 13:
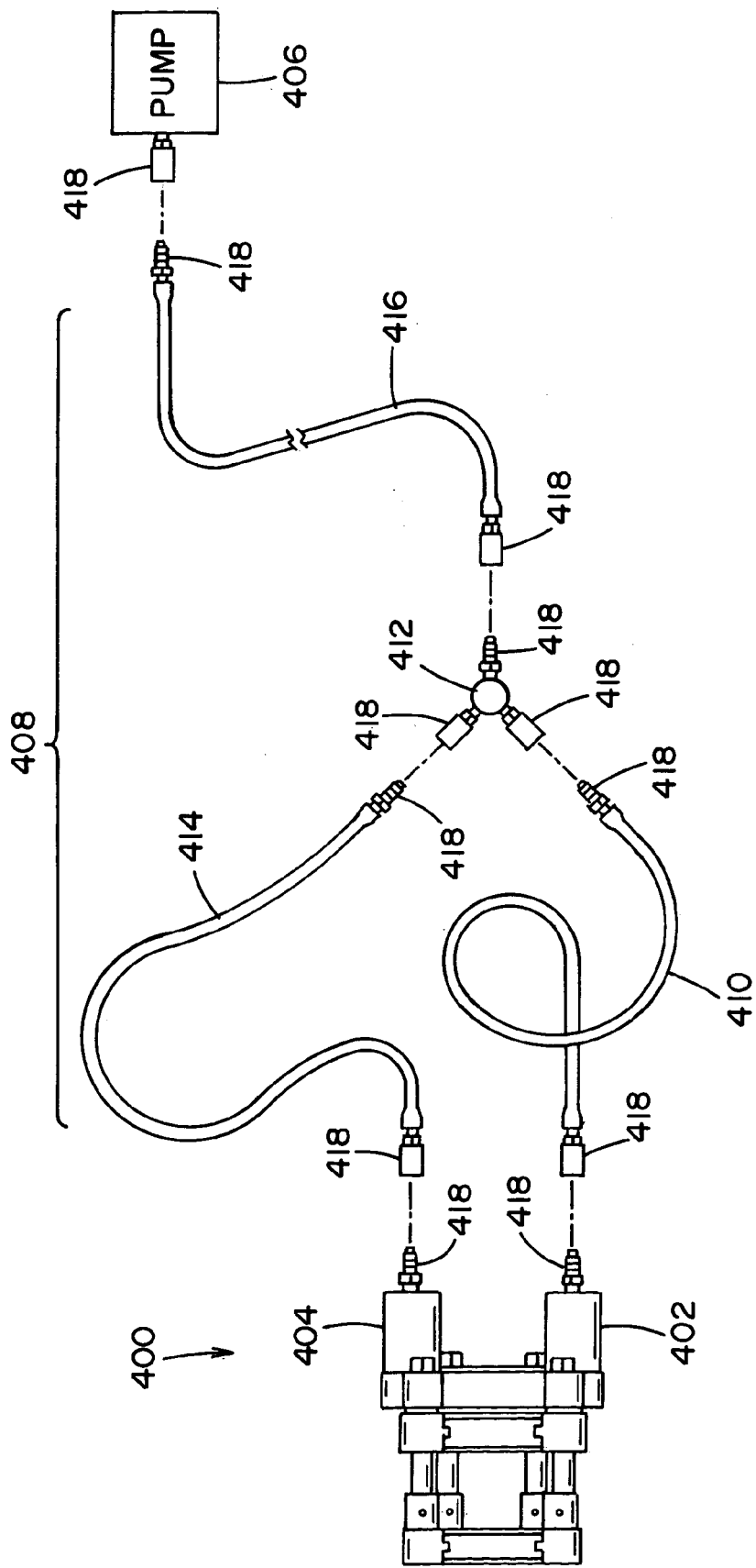
FIG. 13 is a schematic view of the installation tool assembly of FIG. 12 shown with another elongated hose for connecting the adapter to a pump.

In contrast, with reference to FIGS. 12 and 13, one prior art installation tool assembly 400 includes a pair of dual piston chamber portions 402,404 that are fluidly connected to a remote hydraulic pressure supply pump 406 through a multi-hose assembly 408. To provide pressurized hydraulic fluid to both dual piston chamber portions 402,404, hose assembly 408 includes a first elongated flexible hose 410 fluidly connecting the first dual piston chamber portion 402 to a Y-manifold 412 and a second elongated flexible hose 414 fluidly connecting the second dual piston chamber portion 404 to the manifold 412.

In the typical hose assembly of prior art installation tool assemblies, such as hose assembly 408, the first and second hoses 410,414 are each about 5 feet (1.524 meters) long. A third long or elongated flexible hose 416, about 15 feet (4.572 meters) long in the illustrated hose assembly 408, fluidly connects the Y-manifold 412 to the pump 406. Conventional male/female quick disconnects 418 are provided on each of the dual piston chamber portions 402,404, each end of the hoses 410,414,416, three end connections of the Y-manifold 412 and the pump 406 for making readily disconnectable fluid connections between the aforementioned components.

The use of the Y-manifold or adapter 412 with two elongated hoses 410,414 of about equal length was generally expected to ensure that both sets of dual piston chamber portions 402,404 would operate simultaneously upon generation of hydraulic pressure by the pump 406. However, its has been found that, under certain conditions, the hydraulic connections formed by mating male and female quick disconnects can come loose without the knowledge of the operator of the prior art installation tool assembly 400. This may occur, for example, when the mating quick connects are mechanically connected but not so connected as to open a hydraulic flow path. If a hydraulic connection is not properly made with each of the hoses 410,414 and only one of the dual piston chambers 402,404 is fluidly connected to the pump 406, serious damage can occur due to high forces developed by the hydraulic pressure acting on only one set of the pistons in the chamber portions 402,404.

Thus, another advantage of the installation tool assembly 10 over the prior art tool assembly 400 is the employment of only one hose 202 and only two hydraulic connections (one end of the hose 202 to the pump 12 and the other end of the hose 202 to the installation tool 10) which lessens the likelihood of a poor connection. In contrast, the described prior art tool assembly 400 includes six (6) separate hydraulic connections. Still another advantage resides in the improved end connections provided with the crossover assembly 18. More particularly, the rigid tube 226 includes secured connections to the portions 20a,20b for fluidly connecting the sets of piston chambers to one another. As illustrated, the tube 226 can be formed to hug or closely follow the contour of the body 20 of the installation tool assembly 10.

The invention has been described with reference to one or more of the embodiments. Obviously, modifications and alterations will occur to others upon reading and understanding the preceding detailed description. It is intended that the invention be construed as including all such modifications and alterations which are intended to be encompassed by the following claims.

What is claimed is:

1. A hydraulic installation tool assembly for advancing a fitting's swage ring onto a fitting's connector body while a conduit is received in the connector body to mechanically and sealingly connect the fitting to the conduit, said hydraulic installation tool assembly comprising:

a body defining at least two spaced apart piston chambers;

a fixed jaw connected to said body and adapted to engage one of the connector body or the swage ring;

a movable jaw connected to said body and movable relative to said fixed jaw, said movable jaw adapted to engage the other of the connector body or the swage ring;

pistons disposed in said at least two spaced piston chambers, said pistons and said movable jaw configured such that movement of said pistons in a first direction moves said movable jaw toward said fixed jaw thereby moving the swage ring axially onto the connector body to mechanically and sealingly connect the connector body to the conduit received therein when said fixed and movable jaws are engaged to the connector body and swage ring; and a plurality of tie rods extending from the body in a direction opposite said at least two spaced apart piston chambers, said fixed jaw disposed along said tie rods at a location spaced from said body and said movable jaw disposed between said fixed jaw and said body for movement along said tie rods;

a crossover assembly curved and conforming about the body to closely follow three dimensional contours of the body, said crossover assembly fluidly connecting said at least two spaced apart piston chambers, and said crossover assembly fluidly connectable to a hydraulic pressure source that simultaneously delivers hydraulic fluid to said at least two spaced apart piston chambers to move said pistons in said first direction;

an elongated hose connecting said at least two piston chambers to a remotely positioned pump serving as said hydraulic pressure source; and an articulating assembly rotatably connecting said body and said crossover assembly to said elongated hose, wherein said articulating assembly (i) allows said body and said crossover assembly to be rotated about a first axis relative to said hose and (ii) allows said body and said crossover assembly to be rotated about a second axis relative to said hose, said second axis angularly disposed relative to said first axis.

2. The hydraulic installation tool assembly of claim 1 wherein said at least two spaced apart piston chambers include a first set of piston chambers and a second set of piston chambers, said first and second sets of piston chambers diametrically opposed to each other on opposite sides of the associated conduit received in the fixed and movable jaws.

3. The hydraulic installation tool assembly of claim 1 wherein said crossover assembly directs fluid from said hydraulic pressure source in equal proportions to each of said at least two spaced apart piston chambers.

4. The hydraulic installation tool assembly of claim 1 wherein said crossover assembly includes a first attaching member adjacent and fluidly connected to a first of said at least two spaced apart piston chambers, a second attaching member adjacent and fluidly connected to a second of said at least two spaced apart piston chambers, and a rigid tubular connector closely adjacent and following the contours of said body, said rigid tubular connector fluidly connecting said first attaching member to said second attaching member.

5. The hydraulic installation tool assembly of claim 1 wherein said first axis is approximately normal relative to said second axis.

6. The hydraulic installation tool assembly of claim 1 further including at least one spring urging said pistons in a second direction opposite said first direction, said urging by said at least one spring moving said movable jaw apart from said fixed jaw unless said hydraulic fluid provides sufficient force against said pistons to overcome said urging of said at least one spring.

7. The hydraulic installation tool assembly of claim 1 wherein said at least two spaced apart piston chambers are radially spaced apart from one another.

8. The hydraulic installation tool assembly of claim 7 wherein said at least two spaced apart piston chambers are diametrically opposed to one another on opposite sides of the associated conduit received in said fixed and movable jaws.

9. A hydraulic installation tool assembly for advancing a fitting's swage ring onto a fitting's connector body while a conduit is received in the connector body to mechanically and sealingly connect the fitting to the conduit, said hydraulic installation tool assembly comprising:

a body defining at least two spaced apart piston chambers;

a fixed jaw connected to said body and adapted to engage one of the connector body or the swage ring;

a movable jaw connected to said body and movable relative to said fixed jaw, said movable jaw adapted to engage the other of the connector body or the swage ring;

pistons disposed in said at least two spaced piston chambers, said pistons and said movable jaw configured such that movement of said pistons in a first direction moves said movable jaw toward said fixed jaw thereby moving the swage ring axially onto the connector body to mechanically and sealingly connect the connector body to the conduit received therein when said fixed and movable jaws are engaged to the connector body and swage ring; and a crossover assembly following the contours of the body and fluidly connecting said at least two spaced apart piston chambers, said crossover assembly fluidly connectable to a hydraulic pressure source that simultaneously delivers hydraulic fluid to said at least two spaced apart piston chambers to move said pistons in said first direction;

a rigid tubular section having at least a first section extending along a proximal end of a first piston chamber, a second section extending axially along said first piston chamber, a third section extending between said first and a second piston chamber along said body, a fourth section extending axially along said second piston chamber and a fifth section extending along a proximal end of said second piston chamber;

an elongated hose connecting said at least two piston chambers to a remotely positioned pump serving as said hydraulic pressure source; and an articulating assembly rotatably connecting said body and said crossover assembly to said elongated hose, wherein said articulating assembly (i) allows said body and said crossover assembly to be rotated about a first axis relative to said hose and (ii) allows said body and said crossover assembly to be rotated about a second axis relative to said hose, said second axis angularly disposed relative to said first axis.

10. A hydraulic installation tool assembly for advancing a fitting's swage ring onto a fitting's connector body while a conduit is received in the connector body to mechanically and sealingly connect the fitting to the conduit, said hydraulic installation tool assembly comprising:

a body defining at least two spaced apart piston chambers;

a fixed jaw connected to said body and adapted to engage one of the connector body or the swage ring;

a movable jaw connected to said body and movable relative to said fixed jaw, said movable jaw adapted to engage the other of the connector body or the swage ring;

pistons disposed in said at least two spaced piston chambers, said pistons and said movable jaw configured such that movement of said pistons in a first direction moves said movable jaw toward said fixed jaw thereby moving the swage ring axially onto the connector body to mechanically and sealingly connect the connector body to the conduit received therein when said fixed and movable jaws are engaged to the connector body and swage ring; and a crossover assembly following the contours of the body and fluidly connecting said at least two spaced apart piston chambers, said crossover assembly fluidly connectable to a hydraulic pressure source for delivering hydraulic fluid to said at least two spaced apart piston chambers to move said pistons in said first direction;

wherein the body includes a U-shaped portion adjacent said movable jaw and said at least two spaced apart piston chambers including a first set of piston chambers and a second set of piston chambers, a first portion extending axially from said U-shaped portion opposite said movable jaw and defining said first set of piston chambers, and a second portion extending axially from said U-shaped portion opposite said movable jaw and defining said second set of piston chambers, said second portion spaced apart radially from and opposite said first portion.

11. The hydraulic installation tool assembly of claim 10 wherein said crossover assembly includes a rigid tubular section having a first section extending along a proximal end of said first portion, a second section extending axially along said first portion, a third section extending between said first and second portion along said U-shaped portion, a fourth section extending axially along said second portion and a fifth section extending along a proximal end of said second portion.

12. The hydraulic installation tool assembly of claim 10 further including a plurality of tie rods extending axially from said U-shaped portion in a direction opposite said first and second portions, said fixed jaw disposed along said tie rods at a location spaced from said body and said movable jaw disposed between said fixed jaw and said body for movement along said tie rods.

13. The hydraulic installation tool assembly of claim 12 including only a single hydraulic connector for fluidly connecting to said hydraulic pressure source through a single hose, said single hydraulic connector in fluid communication with said at least two spaced apart piston chambers through said crossover assembly.

14. The hydraulic installation tool assembly of claim 10 furthering including: first and second bridge members, said first bridge member removably connected to said fixed jaw and said second bridge member removably connected to said movable jaw, said first and second bridge members, together with said fixed and movable jaws, circumferentially surrounding the fitting and the conduit.

15. A hydraulic assembly tool, comprising:
a body defining spaced apart piston chambers;
a fixed jaw one of formed integrally with said body or secured to said body;
a movable jaw secured to and movable relative to said body and said fixed jaw;
a piston disposed in each of said spaced apart piston chambers, movement of said piston in a first direction moves said movable jaw toward said fixed jaw;
a plurality of tie rods extending from the body in a direction opposite said spaced apart piston chambers, said fixed jaw disposed along said tie rods at a location spaced from said body and said movable jaw disposed between said fixed jaw and said body for movement along said tie rods;
a crossover assembly having a rigid tubular connector disposed closely adjacent said body for delivering pressurized hydraulic fluid delivered to a hydraulic connection disposed on said body to each of said spaced apart piston chambers to move said piston disposed in each of said spaced apart piston chambers in said first direction thereby moving said movable jaw toward said fixed jaw;
a hose fluidly connecting said crossover assembly to a hydraulic pressure source; and
wherein said crossover assembly closely follows nonlinear contours of said body in fluidly connecting said spaced apart piston chambers, and wherein said hydraulic connection is an articulating assembly rotatably connecting said body to a hydraulic hose that delivers said hydraulic fluid, said articulating assembly enabling said body and said hydraulic hose to be moved relative to one another about two axes.

16. The hydraulic assembly tool of claim 15 wherein said fixed and movable jaws are configured to engage and axially force a swage ring onto a fitting body to connect and seal said fitting body to a fluid conduit received in said fitting body.

17. The hydraulic installation tool assembly of claim 9 wherein said first axis is approximately normal relative to said second axis.

* * * * *